(12) United States Patent
Kim et al.

(10) Patent No.: US 12,294,185 B2
(45) Date of Patent: May 6, 2025

(54) ELECTRICAL CONNECTOR FORMED FROM A POLYMER COMPOSITION HAVING A LOW DIELECTRIC CONSTANT AND DISSIPATION FACTOR

(71) Applicant: Ticona LLC, Florence, KY (US)

(72) Inventors: Young Shin Kim, Cincinnati, OH (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 377 days.

(21) Appl. No.: 16/995,872

(22) Filed: Aug. 18, 2020

(65) Prior Publication Data

US 2021/0075162 A1 Mar. 11, 2021

Related U.S. Application Data

(60) Provisional application No. 63/056,848, filed on Jul. 27, 2020, provisional application No. 63/038,965, filed on Jun. 15, 2020, provisional application No. 63/008,983, filed on Apr. 13, 2020, provisional application No. 62/994,317, filed on Mar. 25, 2020, provisional application No. 62/898,202, filed on Sep. 10, 2019.

(51) Int. Cl.
*H01R 13/646* (2011.01)
*C08G 69/26* (2006.01)

(52) U.S. Cl.
CPC ......... *H01R 13/646* (2013.01); *C08G 69/265* (2013.01)

(58) Field of Classification Search
None
See application file for complete search history.

(56) References Cited

U.S. PATENT DOCUMENTS 3,838,111 A * 9/1974 Campbell ............ C08G 69/265
528/346
4,162,466 A 7/1979 Hunsinger et al.
(Continued)

FOREIGN PATENT DOCUMENTS

CA 2585470 A1 * 5/2006
CN 104961916 A 10/2015
(Continued)

OTHER PUBLICATIONS

The product information sheet for 3M Glass Bubbles published online at https://multimedia.3m.com/mws/media/619093O/3m-glass-bubbles-types-k-and-s-uk-data-sheet.pdf and dated 2009 (Year: 2009).*

(Continued)

*Primary Examiner* — Michael C Romanowski
(74) *Attorney, Agent, or Firm* — Dority & Manning, P.A.

(57) ABSTRACT

An electrical connector is disclosed that comprises at least two opposing walls between which a passageway is defined for receiving a contact pin, wherein the walls have a width of about 500 micrometers or less and are formed from a polymer composition that comprises a polymer matrix containing at least one polymer having a glass transition temperature of about 30° C. or more in an amount of 30 wt. % or more of the composition. The polymer composition exhibits a dielectric constant of about 4 or less and a dissipation factor of about 0.02 or less, as determined at a frequency of 10 GHz.

30 Claims, 4 Drawing Sheets

(56) References Cited

U.S. PATENT DOCUMENTS

| | | |
|---|---|---|
| 4,458,039 A | 7/1984 | Eickman |
| 4,746,694 A | 5/1988 | Charbonneau et al. |
| 4,960,654 A | 10/1990 | Yoshinaka et al. |
| 5,032,627 A | 7/1991 | Wilson et al. |
| 5,348,990 A | 9/1994 | Walpita et al. |
| 5,541,240 A | 7/1996 | Makhija et al. |
| 5,624,984 A | 4/1997 | Furuta et al. |
| 5,767,195 A | 6/1998 | Furuta et al. |
| 6,121,369 A | 9/2000 | Stack et al. |
| 6,303,524 B1 | 10/2001 | Sharangpani et al. |
| 6,346,864 B1 | 2/2002 | Kadota |
| 6,350,822 B1 | 2/2002 | Van Diepen et al. |
| 6,495,616 B2 | 12/2002 | Maeda |
| 6,641,928 B2 | 11/2003 | Takeichi et al. |
| 6,756,427 B2 | 6/2004 | Maeda |
| 6,818,821 B2 | 11/2004 | Fujieda et al. |
| 6,894,141 B2 | 5/2005 | Satoh et al. |
| 6,984,712 B2 | 1/2006 | Ueno et al. |
| 7,014,921 B2 | 3/2006 | Okamoto et al. |
| 7,063,892 B2 | 6/2006 | Okamoto et al. |
| 7,079,405 B2 | 7/2006 | Tobita et al. |
| 7,148,311 B2 | 12/2006 | Benicewicz et al. |
| 7,180,172 B2 | 2/2007 | Sethumadhaven et al. |
| 7,223,807 B2 | 5/2007 | Okamoto et al. |
| 7,239,261 B2 | 7/2007 | Fujieda et al. |
| 7,247,590 B2 | 7/2007 | Kawabata et al. |
| 7,314,898 B2 | 1/2008 | Downing, Jr. et al. |
| 7,455,901 B2 | 11/2008 | Yano et al. |
| 7,504,150 B2 | 3/2009 | Lee et al. |
| 7,531,204 B2 | 5/2009 | Lee et al. |
| 7,547,849 B2 | 6/2009 | Lee et al. |
| 7,583,226 B2 | 9/2009 | Sakurada |
| 7,618,553 B2 | 11/2009 | Kim et al. |
| 7,648,758 B2 | 1/2010 | Morin |
| 7,704,408 B2 | 5/2010 | Fuksatu |
| 7,713,439 B2 | 5/2010 | Murouchi et al. |
| 7,737,198 B2 | 6/2010 | Murouchi et al. |
| 7,790,786 B2 | 9/2010 | Murouchi et al. |
| 7,816,014 B2 | 10/2010 | Ito et al. |
| 7,897,083 B2 | 3/2011 | Fukatsu et al. |
| 7,985,351 B2 | 7/2011 | Yamauchi et al. |
| 8,012,352 B1 | 9/2011 | Giraldo et al. |
| 8,025,814 B2 | 9/2011 | Uehara et al. |
| 8,043,527 B2 | 10/2011 | Iwase et al. |
| 8,044,151 B2 | 10/2011 | Asahara et al. |
| 8,066,907 B2 | 11/2011 | Kohinata et al. |
| 8,192,645 B2 | 6/2012 | Murouchi et al. |
| 8,222,802 B2 | 7/2012 | Saito et al. |
| 8,226,851 B2 | 7/2012 | Harada et al. |
| 8,231,807 B2 | 7/2012 | Yonezawa et al. |
| 8,309,640 B2 | 11/2012 | Li et al. |
| 8,324,307 B2 | 12/2012 | Harder et al. |
| 8,337,719 B2 | 12/2012 | Hosoda et al. |
| 8,425,798 B2 | 4/2013 | Saito et al. |
| 8,475,924 B2 | 7/2013 | Lee et al. |
| 8,492,464 B2 | 7/2013 | Li et al. |
| 8,545,718 B2 | 10/2013 | Nakayama et al. |
| 8,580,145 B2 | 11/2013 | Osato et al. |
| 8,641,924 B2 | 2/2014 | Sekimura et al. |
| 8,642,682 B2 | 2/2014 | Nishihata |
| 8,692,272 B2 | 4/2014 | Matsumi et al. |
| 8,703,011 B2 | 4/2014 | Wang et al. |
| 8,715,526 B2 | 5/2014 | Kitai et al. |
| 8,816,019 B2 | 8/2014 | Ganguly et al. |
| 8,841,367 B2 | 9/2014 | Zheng et al. |
| 8,883,900 B2 | 11/2014 | Jiang et al. |
| 8,894,880 B2 | 11/2014 | Shin et al. |
| 8,895,649 B2 | 11/2014 | Li et al. |
| 8,926,862 B2 | 1/2015 | Kim et al. |
| 8,927,661 B2 | 1/2015 | Li et al. |
| 8,946,333 B2 | 2/2015 | Raman et al. |
| 8,992,805 B2 | 3/2015 | Nishimura et al. |
| 9,018,286 B2 | 4/2015 | Daga et al. |
| 9,023,923 B2 | 5/2015 | An et al. |
| 9,074,070 B2 | 7/2015 | Yung et al. |
| 9,185,800 B2 | 11/2015 | Meng et al. |
| 9,234,092 B2 | 1/2016 | Nakayama et al. |
| 9,258,892 B2 | 2/2016 | Crosley |
| 9,283,707 B2 | 3/2016 | Saito et al. |
| 9,321,906 B2 | 4/2016 | Takeshi et al. |
| 9,355,753 B2 | 5/2016 | Kim |
| 9,365,693 B2 | 6/2016 | Takano et al. |
| 9,394,483 B2 | 7/2016 | Wu et al. |
| 9,490,560 B2 | 11/2016 | Chawla et al. |
| 9,538,646 B2 | 1/2017 | Onodera et al. |
| 9,574,065 B2 | 2/2017 | Miyamoto et al. |
| 9,850,343 B2 | 12/2017 | Konishi et al. |
| 9,896,566 B2 | 2/2018 | Yung et al. |
| 9,944,768 B2 | 4/2018 | Cheng et al. |
| 9,982,113 B2 | 5/2018 | Kniess et al. |
| 10,106,682 B2 | 10/2018 | Kim |
| 10,119,021 B2 | 11/2018 | Li et al. |
| 10,150,863 B2 | 12/2018 | Wu et al. |
| 10,174,180 B2 | 1/2019 | Bao et al. |
| 10,233,301 B2 | 3/2019 | Kato et al. |
| 10,239,277 B2 | 3/2019 | Kugel et al. |
| 10,273,362 B2 | 4/2019 | Zhang et al. |
| 10,290,389 B2 | 5/2019 | Wu et al. |
| 10,329,422 B2 | 6/2019 | Li et al. |
| 10,385,193 B2 | 8/2019 | Yalcin et al. |
| 10,604,649 B2 | 3/2020 | Yamanaka |
| 10,696,787 B2 | 6/2020 | Takasuka et al. |
| 10,697,065 B2 | 6/2020 | Hua et al. |
| 10,714,810 B2 | 7/2020 | Hong et al. |
| 10,741,932 B2 | 8/2020 | Thai et al. |
| 10,767,049 B2 | 9/2020 | Kim |
| 10,784,030 B2 | 9/2020 | Lee et al. |
| 10,822,452 B2 | 11/2020 | Tsuchiya et al. |
| 10,822,453 B2 | 11/2020 | Washino |
| 10,899,900 B2 | 1/2021 | Jung et al. |
| 10,968,311 B2 | 4/2021 | Washino |
| 10,968,347 B2 | 4/2021 | Akiyama et al. |
| 11,028,250 B2 | 6/2021 | Zhang et al. |
| 11,075,442 B2 | 7/2021 | Wang et al. |
| 11,505,647 B2 | 11/2022 | Washino |
| 11,674,083 B2 | 6/2023 | Konno et al. |
| 2004/0165390 A1 | 8/2004 | Sato et al. |
| 2005/0130447 A1 | 6/2005 | Takaya et al. |
| 2006/0047100 A1* | 3/2006 | Murouchi ............... C08K 7/24 528/272 |
| 2007/0010647 A1 | 1/2007 | Ueno et al. |
| 2007/0057236 A1 | 3/2007 | Hosoda et al. |
| 2010/0012354 A1 | 1/2010 | Hedin et al. |
| 2010/0051999 A1 | 3/2010 | Iwase et al. |
| 2010/0053972 A1 | 3/2010 | Nakayama |
| 2010/0263919 A1 | 10/2010 | Lee et al. |
| 2010/0278538 A1* | 11/2010 | Guidotti ............... H04B 10/90 398/115 |
| 2010/0327728 A1 | 12/2010 | Saito et al. |
| 2012/0040128 A1 | 2/2012 | Finn |
| 2012/0119142 A1* | 5/2012 | Osato ............... C09K 19/3809 252/299.62 |
| 2012/0276390 A1 | 11/2012 | Ji et al. |
| 2013/0082206 A1* | 4/2013 | Fukuhara ............ H05K 7/1053 252/299.5 |
| 2013/0119317 A1* | 5/2013 | Kim ..................... C09K 19/00 252/500 |
| 2013/0122272 A1* | 5/2013 | Kim ........................ C08K 5/09 252/299.62 |
| 2013/0122273 A1* | 5/2013 | Kim .................. C09K 19/3809 252/299.62 |
| 2013/0122758 A1* | 5/2013 | Kim ........................ C08K 7/14 524/602 |
| 2013/0344337 A1 | 12/2013 | Qi et al. |
| 2014/0060899 A1 | 3/2014 | Park et al. |
| 2014/0087149 A1* | 3/2014 | Nair .................... B32B 27/286 528/172 |
| 2014/0088285 A1* | 3/2014 | Nair .................... C08G 63/605 528/192 |
| 2014/0128545 A1 | 5/2014 | Xiong et al. |
| 2014/0142571 A1 | 5/2014 | Yung et al. |
| 2014/0159285 A1 | 6/2014 | Choi |
| 2014/0171567 A1 | 6/2014 | Guo et al. |

(56) References Cited

U.S. PATENT DOCUMENTS

| | | |
|---|---|---|
| 2014/0296411 A1 | 10/2014 | Cheng et al. |
| 2014/0353543 A1 | 12/2014 | Wu et al. |
| 2014/0364562 A1* | 12/2014 | Zhao .................. C09K 19/3809 524/602 |
| 2015/0102528 A1 | 4/2015 | Gunes et al. |
| 2015/0337132 A1 | 11/2015 | Van der Burgt |
| 2016/0053107 A1* | 2/2016 | Mazahir .............. C09K 19/542 525/397 |
| 2016/0116948 A1 | 4/2016 | Ou et al. |
| 2016/0301141 A1 | 10/2016 | Del Castillo et al. |
| 2017/0002193 A1 | 1/2017 | Cheng et al. |
| 2017/0273179 A1 | 9/2017 | Kim |
| 2017/0361584 A1 | 12/2017 | Feng et al. |
| 2017/0362731 A1 | 12/2017 | Wang et al. |
| 2017/0367182 A1 | 12/2017 | Wu et al. |
| 2018/0215894 A1 | 8/2018 | Cheng et al. |
| 2018/0230294 A1 | 8/2018 | Cheng et al. |
| 2018/0332710 A1 | 11/2018 | Lin et al. |
| 2018/0346711 A1 | 12/2018 | Van der Burgt et al. |
| 2018/0355150 A1* | 12/2018 | Kim .................. C08J 3/201 |
| 2018/0362758 A1 | 12/2018 | Wu et al. |
| 2019/0027813 A1 | 1/2019 | Wang |
| 2019/0031838 A1* | 1/2019 | Suzuki .................. G02B 7/02 |
| 2019/0031879 A1 | 1/2019 | Ding et al. |
| 2019/0153216 A1 | 5/2019 | Gong et al. |
| 2019/0202978 A1* | 7/2019 | Washino .............. C08G 63/60 |
| 2019/0237851 A1 | 8/2019 | Gu |
| 2019/0269012 A1 | 8/2019 | Van der Burgt |
| 2019/0322861 A1 | 10/2019 | Wei et al. |
| 2019/0341696 A1 | 11/2019 | O'Connor et al. |
| 2019/0352501 A1 | 11/2019 | Wang et al. |
| 2019/0352503 A1 | 11/2019 | Cheng et al. |
| 2020/0017769 A1 | 1/2020 | Konno et al. |
| 2020/0022264 A1 | 1/2020 | Cheng et al. |
| 2020/0040133 A1* | 2/2020 | Washino .............. C08G 63/189 |
| 2020/0076035 A1 | 3/2020 | Huh et al. |
| 2020/0091608 A1 | 3/2020 | Alpman et al. |
| 2020/0219861 A1 | 7/2020 | Kamgaing et al. |
| 2020/0299582 A1 | 9/2020 | Komatsu |
| 2020/0308487 A1 | 10/2020 | Hegi |
| 2020/0347224 A1 | 11/2020 | Hara |
| 2020/0369884 A1 | 11/2020 | Lee et al. |
| 2020/0399465 A1 | 12/2020 | Hara |
| 2021/0002507 A1 | 1/2021 | Azami et al. |
| 2021/0024687 A1 | 1/2021 | Ohtomo et al. |
| 2021/0024701 A1 | 1/2021 | Wang et al. |
| 2021/0054190 A1 | 2/2021 | Kim |
| 2021/0057811 A1 | 2/2021 | Kim |
| 2021/0057827 A1 | 2/2021 | Kim et al. |
| 2021/0070927 A1 | 3/2021 | Zhang et al. |
| 2021/0070929 A1 | 3/2021 | Kim et al. |
| 2021/0070983 A1 | 3/2021 | Kim et al. |
| 2021/0075093 A1 | 3/2021 | Zhang et al. |
| 2021/0091818 A1 | 3/2021 | Zhang et al. |
| 2021/0092836 A1 | 3/2021 | Zhang et al. |
| 2021/0130585 A1 | 5/2021 | Wang et al. |
| 2021/0130604 A1 | 5/2021 | Ramakrishnan et al. |
| 2021/0143539 A1 | 5/2021 | Yuan et al. |
| 2021/0251074 A1 | 8/2021 | Onodera et al. |
| 2021/0269588 A1* | 9/2021 | Washino .............. C08G 63/605 |
| 2021/0274652 A1 | 9/2021 | Kim |
| 2021/0292475 A1 | 9/2021 | Konishi et al. |
| 2022/0073732 A1 | 3/2022 | Washino |
| 2022/0302581 A1 | 9/2022 | Sunamoto et al. |
| 2023/0065239 A1 | 3/2023 | Konishi et al. |
| 2023/0069551 A1 | 3/2023 | Ohtomo et al. |

FOREIGN PATENT DOCUMENTS

| | | |
|---|---|---|
| CN | 104961922 A | 10/2015 |
| CN | 105504247 A | 4/2016 |
| CN | 105542408 A | 5/2016 |
| CN | 106633680 A | 5/2017 |
| CN | 106633859 A | 5/2017 |
| CN | 107022171 A | 8/2017 |
| CN | 105623206 B | 12/2017 |
| CN | 108045022 A | 5/2018 |
| CN | 108102314 A | 6/2018 |
| CN | 108178906 A | 6/2018 |
| CN | 108250692 A | 7/2018 |
| CN | 207772540 U | 8/2018 |
| CN | 105860036 B | 9/2018 |
| CN | 108148433 A | 12/2018 |
| CN | 109301507 A | 2/2019 |
| CN | 109467643 A | 3/2019 |
| CN | 109467722 A | 3/2019 |
| CN | 109509975 A | 3/2019 |
| CN | 208675597 U | 3/2019 |
| CN | 106633860 B | 4/2019 |
| CN | 106750198 B | 5/2019 |
| CN | 109735060 A | 5/2019 |
| CN | 109742534 A | 5/2019 |
| CN | 109755729 A | 5/2019 |
| CN | 109755733 A | 5/2019 |
| CN | 109790361 A | 5/2019 |
| CN | 208904227 U | 5/2019 |
| CN | 110154464 A | 8/2019 |
| CN | 209266563 U | 8/2019 |
| CN | 209266570 U | 8/2019 |
| CN | 209266571 U | 8/2019 |
| CN | 108884329 B | 10/2019 |
| CN | 209516005 U | 10/2019 |
| CN | 209544599 U | 10/2019 |
| CN | 110505753 A | 11/2019 |
| CN | 110527071 A | 12/2019 |
| CN | 110746754 A | 2/2020 |
| CN | 110769594 A | 2/2020 |
| CN | 110177821 B | 3/2020 |
| CN | 110862523 A | 3/2020 |
| CN | 110903612 A | 3/2020 |
| CN | 111087765 A | 5/2020 |
| CN | 111087797 A | 5/2020 |
| CN | 111117169 A | 5/2020 |
| CN | 111138815 A | 5/2020 |
| CN | 111286176 A | 6/2020 |
| CN | 111320848 A | 6/2020 |
| CN | 210706390 U | 6/2020 |
| CN | 111393806 A | 7/2020 |
| CN | 110603278 B | 2/2021 |
| CN | 109705322 B | 9/2021 |
| CN | 110982050 B | 2/2022 |
| CN | 109661433 B | 5/2022 |
| CN | 111936547 B | 5/2022 |
| CN | 115279832 A | 11/2022 |
| EP | 2 774 952 B1 | 9/2014 |
| EP | 2 981 573 B1 | 6/2018 |
| EP | 3 674 080 A1 | 7/2020 |
| EP | 3 674 368 A1 | 7/2020 |
| EP | 3 730 545 A1 | 10/2020 |
| JP | 2001031848 A | 2/2001 |
| JP | 2003268089 A | 9/2003 |
| JP | 2003268241 A | 9/2003 |
| JP | 2004143270 A | 5/2004 |
| JP | 2004277539 A | 10/2004 |
| JP | 2004323705 A * | 11/2004 |
| JP | 2005078806 A | 3/2005 |
| JP | 4945097 B2 | 1/2007 |
| JP | 2007002230 * | 1/2007 |
| JP | 2007154169 A | 6/2007 |
| JP | 2007273537 A | 10/2007 |
| JP | 2009114418 A | 5/2009 |
| JP | 4339966 B2 | 10/2009 |
| JP | 2010254875 A | 11/2010 |
| JP | 2011046775 * | 3/2011 |
| JP | 2011052037 A | 3/2011 |
| JP | 2011093973 A | 5/2011 |
| JP | 2013108008 A | 6/2013 |
| JP | 5280281 B2 | 9/2013 |
| JP | 5332081 B2 | 11/2013 |
| JP | 2015059178 A | 3/2015 |
| JP | 5866423 B2 | 2/2016 |
| JP | 2016041828 A | 3/2016 |
| JP | 5919613 B2 | 5/2016 |

(56) References Cited

FOREIGN PATENT DOCUMENTS

| | | |
|---|---|---|
| JP | 5924527 B2 | 5/2016 |
| JP | 2017057258 A | 3/2017 |
| JP | 2017095625 A | 6/2017 |
| JP | 2017119378 A | 7/2017 |
| JP | 2017120826 A | 7/2017 |
| JP | 6177191 B2 | 8/2017 |
| JP | 6181587 B2 | 8/2017 |
| JP | 2017179127 A | 10/2017 |
| JP | 2018016753 A | 2/2018 |
| JP | 2018016754 A | 2/2018 |
| JP | 2018029187 A | 2/2018 |
| JP | 6295013 B2 | 3/2018 |
| JP | 2018030948 A | 3/2018 |
| JP | 6306369 B2 | 4/2018 |
| JP | 6359225 B2 | 7/2018 |
| JP | 2018109090 A | 7/2018 |
| JP | 6405817 B2 | 10/2018 |
| JP | 6405818 B2 | 10/2018 |
| JP | 2018168320 A | 11/2018 |
| JP | 2019006973 A | 1/2019 |
| JP | 6470295 B2 | 2/2019 |
| JP | 2019065263 A | 4/2019 |
| JP | 6533880 B1 | 6/2019 |
| JP | 6533881 B1 | 6/2019 |
| JP | 2019094489 A | 6/2019 |
| JP | 2019094497 A | 6/2019 |
| JP | 2019099618 A | 6/2019 |
| JP | 2019106434 A | 6/2019 |
| JP | 2019116586 A | 7/2019 |
| JP | 2019127556 A | 8/2019 |
| JP | 2019127557 A | 8/2019 |
| JP | 6574281 B2 | 9/2019 |
| JP | 6576754 B2 | 9/2019 |
| JP | 6576808 B2 | 9/2019 |
| JP | 2019189734 A | 10/2019 |
| JP | 2019189735 A | 10/2019 |
| JP | 2019189736 A | 10/2019 |
| JP | 2019189737 A | 10/2019 |
| JP | 6773824 B2 | 10/2020 |
| JP | 6837189 B1 | 3/2021 |
| JP | 6854124 B2 | 4/2021 |
| JP | 6900151 B2 | 7/2021 |
| JP | 6930784 B2 | 9/2021 |
| JP | 6998189 B2 | 1/2022 |
| JP | 7111500 B2 | 8/2022 |
| JP | 7111501 B2 | 8/2022 |
| JP | 7111502 B2 | 8/2022 |
| JP | 7116546 B2 | 8/2022 |
| JP | 7156814 B2 | 10/2022 |
| JP | 7159693 B2 | 10/2022 |
| KR | 20140074094 A | 6/2014 |
| KR | 20140074095 A | 6/2014 |
| KR | 101757308 B1 | 7/2017 |
| KR | 101792873 B1 | 11/2017 |
| KR | 101817365 B1 | 1/2018 |
| KR | 101817366 B1 | 1/2018 |
| KR | 101834703 B1 | 3/2018 |
| KR | 102104752 B1 | 4/2020 |
| KR | 102104753 B1 | 4/2020 |
| KR | 20200070501 A | 6/2020 |
| KR | 102167337 B1 | 10/2020 |
| WO | WO 2014/162254 A1 | 10/2014 |
| WO | WO 2014/180550 A1 | 11/2014 |
| WO | WO 2014/203227 A2 | 12/2014 |
| WO | WO 2017/029608 A1 | 2/2017 |
| WO | WO 2018/026601 A1 | 2/2018 |
| WO | WO 2018/038093 A1 | 3/2018 |
| WO | WO 2018/056294 A1 | 3/2018 |
| WO | WO 2018/141769 A1 | 8/2018 |
| WO | WO 2019/042906 A1 | 3/2019 |
| WO | WO 2019/213920 A1 | 11/2019 |
| WO | WO 2020/095997 A1 | 5/2020 |
| WO | WO 2020/194196 A1 | 10/2020 |
| WO | WO 2020/217225 A1 | 10/2020 |
| WO | WO-2020204124 A1 * | 10/2020 |

OTHER PUBLICATIONS

The E, R and D glass properties technical datasheet published online by Saint-Gobain Vetrotex at https://glassproperties.com/glasses /E_R_ and_ D_glass_properties.pdf (Year: 2002).*

Young Shin Kim, U.S. Appl. No. 17/178,318, filed Feb. 18, 2021, Polymer Composition for Use in an Antenna System.

Amato, Ing. Francesco, Ph.D., "A Primer on 5G," Jan. 11, 2019, 19 pages.

Bjornson, Emil, "Massive MIMO for 5G," Tutorial at 2015 IEEE International Workshop on Signal Processing Advances in Wireless Communications, (SPAWC), Jun. 29, Stockholm, Sweden 58 pages.

Hassan et al., Massive MIMO Wireless Networks: An Overview, *Electronics*, 2017, 6, 63, pp. 1-29.

Jilani et al., "Millimeter-wave Liquid Crystal Polymer Based Antenna Array for Conformal 5G Applications," *IEEE Antennas and Wireless Propagation Letters*, vol. 18, Issue 1, Jan. 2019, pp. 84-88.

Paper—The Fifth Generation of Wireless Network Communications from TE Connectivity, Apr. 2019, 20 pages.

Paper—Material Solutions for 5G Applications from SABIC, 2018, 4 pages.

Takata, et al., "Electrical properties and practical applications of Liquid Crystal Polymer flex," *IEEE Polytronic 2007 Conference*, pp. 67-72.

Technical Article—Plastic Materials—Liquid Crystal Polymers from Steinwall Plastic Injection Molding, May 2016, 3 pages.

Theil et al., "The Effect of Thermal Cycling on a-C:F,H Low Dielectric Constant Films Deposited by ECR Plasma Enhanced Chemical Vapor Deposition," *Proceedings for the International Interconnect Technology Conference*, Jun. 1998, p. 128-131, 3 pages.

International Search Report and Written Opinion for PCT/US2020/ 046901 dated Nov. 10, 2020, 8 pages.

Related Application Form.

* cited by examiner

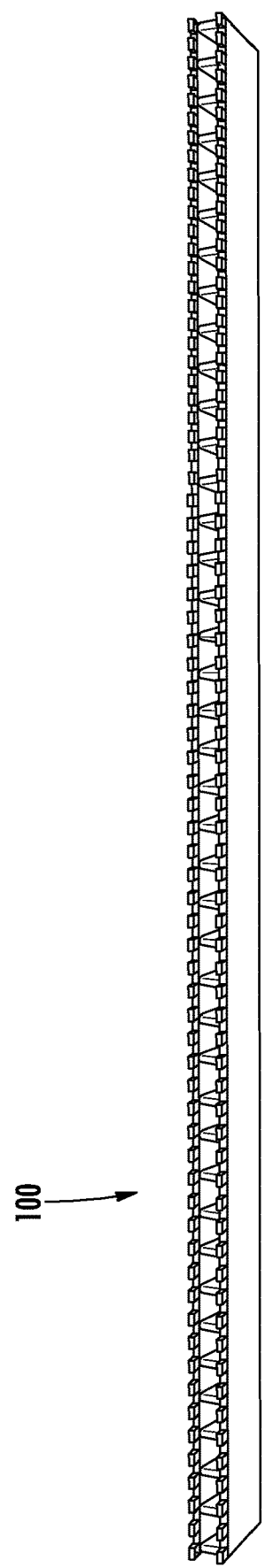

ELECTRICAL CONNECTOR FORMED FROM A POLYMER COMPOSITION HAVING A LOW DIELECTRIC CONSTANT AND DISSIPATION FACTOR

CROSS REFERENCE TO RELATED APPLICATIONS

The present application claims filing benefit of U.S. Provisional Patent Application Ser. No. 62/898,202 having a filing date of Sep. 10, 2019; U.S. Provisional Patent Application Ser. No. 62/994,317 having a filing date of Mar. 25, 2020; U.S. Provisional Patent Application Ser. No. 63/008,983 having a filing date of Apr. 13, 2020; U.S. Provisional Application Ser. No. 63/038,965 having a filing date of Jun. 15, 2020, and U.S. Provisional Application Ser. No. 63/056,848 having a filing date of Jul. 27, 2020, which are incorporated herein by reference in their entirety.

BACKGROUND OF THE INVENTION

High frequency radio signal communication has increased in popularity. For example, the demand for increased data transmission speed for wireless smartphone connectivity has driven demand for high frequency components, including those configured to operate at 5G spectrum frequencies. Components for electrically connecting 5G components, such as antennas, front end modules, and the like generally require small scale features. A trend towards miniaturization has further increased the desirability of small, high frequency 5G connectors. 5G connectors can employ a variety of materials. The properties of such materials, however, can limit miniaturization and/or undesirably permit interference with electrical connections through the 5G connectors. In particular, such materials may exhibit a relatively high dielectric constant and dissipation factor, which can make it difficult to use them in certain applications. Even further, such materials may not exhibit the desired balance among the dielectric properties, thermal properties, and mechanical properties.

As such, a need exists for an electrical connector formed from a polymer composition that can have a relatively low dielectric constant and a relatively low dissipation factor but still maintain excellent mechanical properties and processability (e.g., low viscosity).

SUMMARY OF THE INVENTION

In accordance with one embodiment of the present invention, an electrical connector is disclosed that comprises at least two opposing walls between which a passageway is defined for receiving a contact pin, wherein the walls have a width of about 500 micrometers or less and are formed from a polymer composition that comprises a polymer matrix containing at least one polymer having a glass transition temperature of about 30° C. or more in an amount of about 30 wt. % or more of the composition. The polymer composition exhibits a dielectric constant of about 4 or less and a dissipation factor of about 0.02 or less, as determined at a frequency of 10 GHz.

In accordance with another embodiment of the present invention, a 5G radio frequency communication system is disclosed that includes a radio frequency component configured for operation at greater than about 3 GHz, the radio frequency component comprising a contact pin. The radio frequency component can include a contact pin and an electrical connector coupled with the radio frequency component wherein the electrical connector includes at least two opposing walls between which a passageway is defined, wherein the contact pin of the radio frequency component is received within the passageway of the electrical connector, wherein the walls have a width of about 500 micrometers or less, the walls being formed from a polymer composition as defined above.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which:

FIG. 1A depicts a thin walled electrical connector according to aspects of present invention;

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a thin walled electrical connector that may be used in 5G applications. In particular, the thin walled electrical connector can be formed from a polymer composition that contains a polymer matrix including at least one polymer having a glass transition temperature of about 40° C. or more. The polymer composition may be utilized for such an application because of its relatively low dielectric constant ($D_k$) and dissipation factor ($D_f$) in combination with its good mechanical properties and good processability.

The electrical connector can have a variety of configurations within the scope of this disclosure. As an example, the electrical connector can define a plurality of passageways or spaces between opposing walls. The passageways can accommodate contact pins to facilitate a large number of distinct electrical connections with the pins.

The electrical connector can also be very compact as a result of the polymer composition from which it is formed. For example, the polymer composition may exhibit excellent flow characteristics for forming very small features required to form the electrical connector described herein while also exhibiting minimal warpage when exposed to heat. In this regard, the walls can have respective widths "w" that are relatively thin, such as about 500 micrometers or less, in some embodiments about 400 micrometers or less, in some embodiments from about 25 micrometers to about 350 micrometers, and in some embodiments from about 50 micrometers to about 300 micrometers.

Figure 1B:
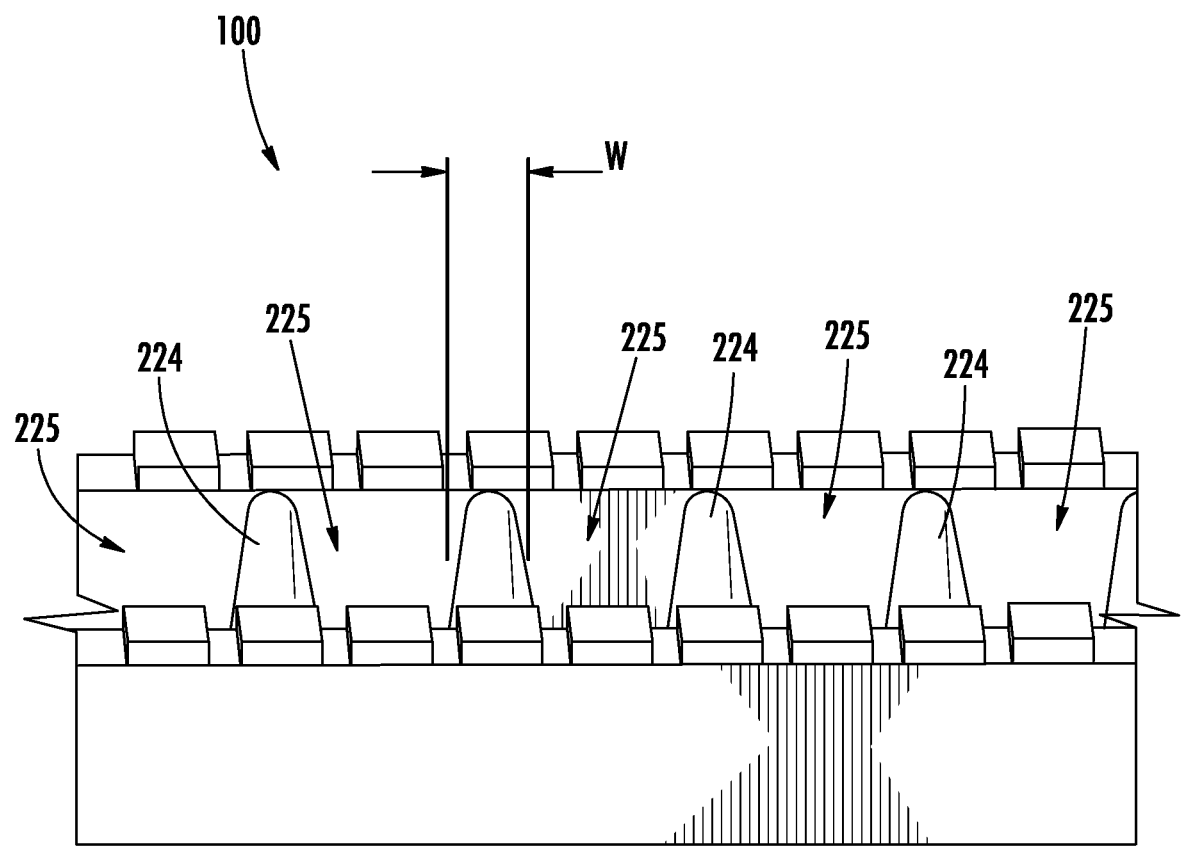
FIG. 1B depicts an enlarged view of a portion of thin walled connector of FIG. 1A.

One particularly suitable electrical connector 100 is shown in FIG. 1A according to aspects of the present invention. FIG. 1B depicts an enlarged view of the electrical connector 100 of FIG. 1A. As illustrated, insertion passageways or spaces 225 are defined between opposing walls 224 that can accommodate contact pins to facilitate a large number of distinct electrical connections. The electrical connector 100 can be very compact. More specifically, the walls 224 can have respective widths "w" that are relatively thin, such as within the ranges described above.

Figure 2:
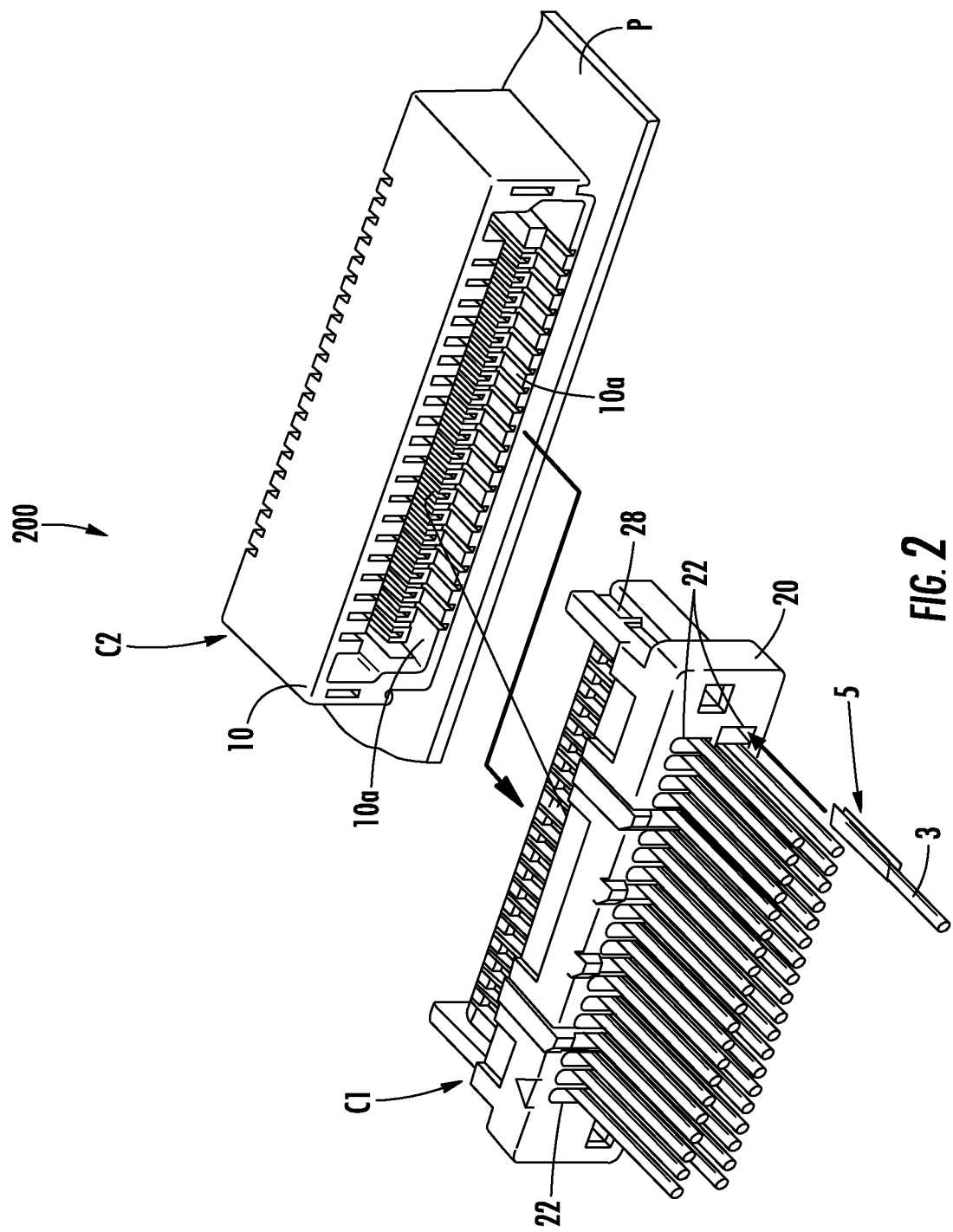
FIG. 2 is an exploded perspective view of another embodiment of a thin walled connector and connector receptacle that may be formed according to the present invention.

Another embodiment of an electrical connector 200 is depicted in FIG. 2. A board-side portion C2 that can be mounted onto the surface of a circuit board P. The connector 200 may also include a wiring material-side portion C1 structured to connect discrete wires 3 to the circuit board P by being coupled to the board-side connector C2. The board-side portion C2 may include a first housing 10 that has a fitting recess 10a into which the wiring material-side connector C1 is fitted and a configuration that is slim and long in the widthwise direction of the housing 10. The wiring material-side portion C1 may likewise include a second housing 20 that is slim and long in the widthwise direction of the housing 20. In the second housing 20, a plurality of terminal-receiving cavities 22 may be provided in parallel in the widthwise direction so as to create a two-tier array including upper and lower terminal-receiving cavities 22. A terminal 5, which is mounted to the distal end of a discrete wire 3, may be received within each of the terminal-receiving cavities 22. If desired, locking portions 28 (engaging portions) may also be provided on the housing 20 that correspond to a connection member (not shown) on the board-side connector C2.

As discussed above, the interior walls of the first housing 10 and/or second housing 20 may have be relatively thin (e.g., may have a relatively small width dimension), and can be formed from the polymer composition of the present invention.

The electrical connector may be formed from a polymer composition that has a relatively low dielectric constant and dissipation factor. By providing a polymer composition with such dielectric properties, this may assist in minimizing signal loss and improving performance when utilized for a particular application, such as in signal transfer applications and in particular those related to 5G communications. As used herein, "5G" generally refers to high speed data communication over radio frequency signals. 5G networks and systems are capable of communicating data at much faster rates than previous generations of data communication standards (e.g., "4G", "LTE"). Various standards and specifications have been released quantifying the requirements of 5G communications. As one example, the International Telecommunications Union (ITU) released the International Mobile Telecommunications-2020 ("IMT-2020") standard in 2015. The IMT-2020 standard specifies various data transmission criteria (e.g., downlink and uplink data rate, latency, etc.) for 5G. The IMT-2020 Standard defines uplink and downlink peak data rates as the minimum data rates for uploading and downloading data that a 5G system must support. The IMT-2020 standard sets the downlink peak data rate requirement as 20 Gbit/s and the uplink peak data rate as 10 Gbit/s.

As another example, $3^{rd}$ Generation Partnership Project (3GPP) recently released new standards for 5G, referred to as "5G NR." 3GPP published "Release 15" in 2018 defining "Phase 1" for standardization of 5G NR. 3GPP defines 5G frequency bands generally as "Frequency Range 1" (FR1) including sub-6 GHz frequencies and "Frequency Range 2" (FR2) as frequency bands ranging from 20-60 GHz. However, as used herein "5G frequencies" can refer to systems utilizing frequencies greater than 60 GHz, for example ranging up to 80 GHz, up to 150 GHz, and up to 300 GHz.

As used herein, "5G frequencies" can refer to frequencies that are about 2.5 GHz or higher, in some embodiments about 3.0 GHz or higher, in some embodiments from about 3 GHz to about 300 GHz, or higher, in some embodiments from about 4 GHz to about 80 GHz, in some embodiments from about 5 GHz to about 80 GHz, in some embodiments from about 20 GHz to about 80 GHz, and in some embodiments from about 28 GHz to about 60 GHz.

Connectors described herein can be used in radio frequency systems that can satisfy or qualify as "5G" under standards released by 3GPP, such as Release 15 (2018), and/or the IMT-2020 Standard. To achieve such high speed data communication at high frequencies, antenna elements and arrays generally employ small feature sizes/spacing (e.g., fine pitch technology) and/or advanced materials that can improve antenna performance. For example, the feature size (spacing between antenna elements, width of antenna elements) etc. is generally dependent on the wavelength ("λ") of the desired transmission and/or reception radio frequency propagating through the substrate dielectric on which the antenna element is formed (e.g., nλ/4 where n is an integer). Further, beamforming and/or beam steering can be employed to facilitate receiving and transmitting across multiple frequency ranges or channels (e.g., MIMO, massive MIMO).

The electrical connector may also reduce or prevent interference (e.g., "cross-talk") between signals that are transmitted on adjacent or nearby pins because of the dielectric properties of the polymer composition from which it is formed. For instance, the dielectric constant of the polymer composition may be about 4 or less, in some embodiments about 3.7 or less, in some embodiments about 3.5 or less, in some embodiments from about 0.5 to about 3.4, and in some embodiments from about 1.0 to about 3.2, as determined by the split post resonator method at a frequency of 10 GHz. In addition, the dissipation factor, a measure of the loss rate of energy, of the polymer composition may be about 0.02 or less, in some embodiments about 0.015 or less, in some embodiments about 0.01 or less, in some embodiments from about 0.001 to about 0.01, and in some embodiments from about 0.001 to about 0.006, as determined by the split post resonator method at a frequency of 10 GHz.

In some embodiments, the polymer composition may employ at least one additive that allows for a reduction in the dielectric constant of the polymer matrix. For instance, utilization of such an additive (e.g., a hollow inorganic filler) may lead to a reduction in the dielectric constant of the polymer matrix by about 2% or more, in some embodiments about 3% or more, in some embodiments from about 3.5% to about 50%, and in some embodiments from about 4% to about 30%. Similarly, the polymer composition may employ at least one additive that allows for a reduction in the dissipation factor of the polymer matrix. For instance, utilization of such an additive (e.g., a hollow inorganic filler) may lead to a reduction in the dissipation factor of the polymer matrix by about 2% or more, in some embodiments about 3% or more, in some embodiments from about 3.5% to about 50%, and in some embodiments from about 4% to about 30%.

Conventionally, it was also believed that polymer compositions exhibiting such a combination of a low dielectric constant and a low dissipation factor would not also possess sufficiently good thermal, mechanical properties and ease in processing (i.e., low viscosity) to enable their use as electrical connectors. Contrary to conventional thought, however, the polymer composition has been found to possess both excellent thermal, mechanical properties and processability.

For example, the melting temperature of the polymer composition may, for instance, be about 180° C. or more, in some embodiments about 200° C., in some embodiments from about 210° C. to about 400° C., and in some embodiments from about 220° C. to about 380° C. Even at such melting temperatures, the ratio of the deflection temperature under load ("DTUL"), a measure of short term heat resistance, to the melting temperature may still remain relatively high. For example, the ratio may range from about 0.5 to about 1.00, in some embodiments from about 0.6 to about 0.95, and in some embodiments from about 0.65 to about 0.85. The specific DTUL values may, for instance, be about 200° C. or more, in some embodiments from about 200° C. to about 350° C., such as from about 210° C. to about 320° C., such as from about 230° C. to about 290° C.

The polymer composition may also possess excellent mechanical properties, which can be useful when forming molded parts. For example, the polymer composition may exhibit a tensile strength of about 20 MPa or more, in some embodiments about 30 MPa or more, in some embodiments from about 40 MPa to about 300 MPa, and in some embodiments from about 50 MPa to about 100 MPa. The tensile properties may be determined at a temperature of 23° C. in accordance with ISO Test No. 527:2012. Also, the polymer composition may exhibit a flexural strength of about 20 MPa or more, in some embodiments about 50 MPa or more, in some embodiments from about 60 MPa to about 300 MPa, and in some embodiments from about 80 MPa to about 250 MPa. The flexural properties may be determined at a temperature of 23° C. in accordance with 178:2010. Furthermore, the polymer composition may also possess a high impact strength, which may be useful when forming thin substrates. The polymer composition may, for instance, possess a Charpy notched impact strength of about 3 $kJ/m^2$ or more, in some embodiments about 5 $kJ/m^2$ or more, in some embodiments about 7 $kJ/m^2$ or more, in some embodiments from about 8 $kJ/m^2$ to about 40 $kJ/m^2$, and in some embodiments from about 10 $kJ/m^2$ to about 25 $kJ/m^2$. The impact strength may be determined at a temperature of 23° C. in accordance with ISO Test No. ISO 179-1:2010.

Various embodiments of the present invention will now be described in more detail.

I. Polymer Composition

A. Polymer Matrix

Any of a variety of polymers or combinations of polymers may generally be employed in the polymer matrix. For example, the polymer may be semi-crystalline or crystalline in nature. In one embodiment, the polymer may be semi-crystalline. In another embodiment, the polymer may be crystalline. In addition, in one embodiment, the polymer may be an aromatic polymer. Alternatively, in another embodiment, the polymer may be an aliphatic polymer.

Suitable polymers may include thermoplastic polymers. For example, these polymers may include, for instance, polyolefins (e.g., ethylene polymers, propylene polymers, etc.), polyamides (e.g., aliphatic, semi-aromatic, or aromatic polyamides), polyesters (e.g., polyethylene terephthalate, polybutylene terephthalate, liquid crystalline polymers), polyarylene sulfides, polyetherimides, polyacetals (e.g., polyoxymethylene), polyphenylene oxides, polyarylketones (e.g., polyetheretherketone, polyetherketoneketone, etc.), polycarbonates, etc., as well as blends thereof.

Regardless, the polymers may be generally considered "high performance" polymers such that they have a relatively high glass transition temperature and/or high melting temperature. Such high performance polymers can thus provide a substantial degree of heat resistance to the polymer composition. For example, the polymer may have a glass transition temperature of about 30° C. or more, in some embodiments about 40° C. or more, in some embodiments from about 50° C. to about 250° C., in some embodiments from about 60° C. to about 150° C. The polymer may also have a melting temperature of about 180° C. or more, in some embodiments about 200° C. or more, in some embodiments from about 210° C. to about 400° C., in some embodiments from about 220° C. to about 380° C. The glass transition and melting temperatures may be determined as is well known in the art using differential scanning calorimetry ("DSC"), such as determined by ISO Test No. 11357-2:2013 (glass transition) and 11357-3:2011 (melting).

One example of a suitable semi-crystalline aromatic polymer, for instance, is an aromatic polyester that is a condensation product of an aromatic dicarboxylic acid having 8 to 14 carbon atoms and at least one diol. Suitable diols may include, for instance, neopentyl glycol, cyclohexanedimethanol, 2,2-dimethyl-1,3-propane diol and aliphatic glycols of the formula $HO(CH_2)_nOH$ where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters may include, for instance, poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly (1,4-cyclohexylene dimethylene terephthalate) (PCT), and copolymers and mixtures of the foregoing.

In one particular embodiment, the polymer may include a polybutylene terephthalate. The polybutylene terephthalate may have a crystallinity of about 38% or more, in some embodiments about 40% or more, and in some embodiments about 45% or more. The crystallinity of the polybutylene terephthalate polymer may generally be about 70% or less, in some embodiments about 65% or less, and in some embodiments about 60% or less. The percent crystallinity may be determined using differential scanning calorimetry (DSC). Such analysis may be performed using a Pyris 6 DSC from PerkinElmer instruments. A detailed description of the calculation is available from Sichina, W. J. "DSC as problem solving tool: measurement of percent crystallinity of thermoplastics." Thermal Analysis Application Note (2000).

In addition, modified or copolymers of polyethylene terephthalate polymers and/or polybutylene terephthalate polymers may also be used. For instance, in one embodiment, a modifying acid or a modifying diol may be used to produce modified polyethylene terephthalate polymers and/ or modified polybutylene terephthalate polymers. As used herein, the terms "modifying acid" and "modifying diol" are meant to define compounds, which can form part of the acid and diol repeat units of a polyester, respectively, and which can modify a polyester to reduce its crystallinity or render the polyester amorphous. Of course, the polyesters may be non-modified and do not contain a modifying acid or a modifying diol. In any event, examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-bis(2-hydroxyethoxy)benzene, 4,4'-bis(2-hydroxyethoxy)diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments 2 to 8 carbon atoms. Cycloaliphatic diols can be employed in their cis- or trans-configuration or as mixtures of both forms.

In some examples, at least one polyester or copolyester present in the polymer composition may have an intrinsic viscosity (IV) of from about 0.5 to about 0.9 dL/g, such as from about 0.5 to about 0.8 dL/g. In one embodiment, for instance, the intrinsic viscosity of the polyester is from about 0.65 to about 0.8 d L/g.

Polyarylene sulfides are also suitable semi-crystalline aromatic polymers. The polyarylene sulfide(s) employed in the composition generally have repeating units of the formula:

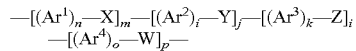

wherein, $Ar^1$, $Ar^2$, $Ar^3$, and $Ar^4$ are independently arylene units of 6 to 18 carbon atoms;

W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—, and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

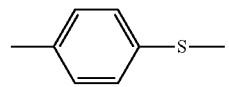

and segments having the structure of formula:

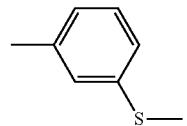

or segments having the structure of formula:

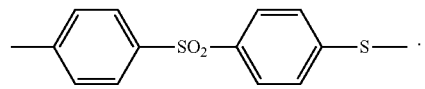

The polyarylene sulfide may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Another example of a suitable semi-crystalline polymer may be a polyamide. For instance, the polyamide may be an aromatic polyamide in one embodiment. In this regard, the aromatic polyamide may have a relatively high melting temperature, such as about 200° C. or more, in some embodiments about 220° C. or more, and in some embodiments from about 240° C. to about 320° C., as determined using differential scanning calorimetry according to ISO Test No. 11357. The glass transition temperature of the aromatic polyamides is likewise generally from about 110° C. to about 160° C. In another embodiment, the aromatic polyamide may be an aliphatic polyamide. In this regard, the aliphatic polyamide may also have a relatively high melting temperature, such as about 180° C. or more, in some embodiments about 200° C. or more, and in some embodiments from about 210° C. to about 320° C., as determined using differential scanning calorimetry according to ISO Test No. 11357. The glass transition temperature of the aliphatic polyamides is likewise generally from about 30° C. to about 170° C.

Aromatic polyamides typically contain repeating units held together by amide linkages (NH—CO) and are synthesized through the polycondensation of dicarboxylic acids (e.g., aromatic dicarboxylic acids), diamines (e.g., aliphatic diamines), etc. For example, the aromatic polyamide may contain aromatic repeating units derived from an aromatic dicarboxylic acid, such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, etc., as well as combinations thereof. Terephthalic acid is particularly suitable. Of course, it should also be understood that other types of acid units may also be employed, such as aliphatic dicarboxylic acid units, polyfunctional carboxylic acid units, etc.

Aliphatic polyamides also typically contain repeating units held together by amide linkages (NH—CO). These polyamides can be synthesized through various techniques. For example, the polyamide may be formed by a ring-opening polymerization, such as a ring-opening polymerization of caprolactam. These polyamides may also be synthesized through the polycondensation of dicarboxylic acids (e.g., aliphatic dicarboxylic acids), diamines, etc. For example, the aromatic polyamide may contain aliphatic repeating units derived from an aliphatic dicarboxylic acid, such as adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimeric acid, the cis- and/or trans-cyclohexane-1,4-dicarboxylic acid, the cis- and/or trans-cyclohexane-1,3-dicarboxylic acid, etc. as well as combinations thereof. Adipic acid is particularly suitable.

The polyamide may also contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Repeating units derived from 1,9-nonanediamine and/or 2-methyl-1,8-octanediamine are particularly suitable. Of course, other diamine units may also be employed, such as alicyclic diamines, aromatic diamines, etc.

Particularly suitable aromatic polyamides may include poly(nonamethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA10T/11), poly(decamethylene terephthalamide/12-aminododecanamide) (PA10T/12), poly (decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/caprolactam) (PA12T/6), poly (dodecamethylene terephthalamide/hexamethylene hexanediamide) (PA12T/66), polyphthalamide (PPA), and so forth. Particularly suitable aliphatic polyamides may include polyamide 4,6, polyamide 5,10, polyamide 6, polyamide 6,6, polyamide 6,9, polyamide 6,10, polyamide 6,12, polyamide 11, polyamide 12, and so forth. Yet other examples of suitable aromatic polyamides are described in U.S. Pat. No. 8,324,307 to Harder, et al.

Another suitable semi-crystalline aromatic polymer that may be employed in the present invention is a polyaryletherketone. Polyaryletherketones are semi-crystalline polymers with a relatively high melting temperature, such as from about 300° C. to about 400° C., in some embodiments from about 310° C. to about 390° C., and in some embodiments from about 330° C. to about 380° C. The glass transition temperature may likewise be from about 110° C. to about 200° C. Particularly suitable polyaryletherketones are those that primarily include phenyl moieties in conjunction with ketone and/or ether moieties. Examples of such polymers include polyetheretherketone ("PEEK"), polyetherketone ("PEK"), polyetherketoneketone ("PEKK"), polyetherketoneetherketoneketone ("PEKEKK"), polyetheretherketoneketone ("PEEKK"), polyether-diphenyl-ether-ether-diphenyl-ether-phenyl-ketone-phenyl, etc., as well as blends and copolymers thereof.

In addition to the polymers referenced above, crystalline polymers may also be employed in the polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). These polymers may also be generally referred to as polyesters. The polymers have a relatively high melting temperature, such as from about 250° C. to about 400° C., in some embodiments from about 280° C. to about 390° C., and in some embodiments from about 300° C. to about 380° C. Such polymers may be formed from one or more types of repeating units as is known in the art. A liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments from about 80 mol. % to about 99 mol. % of the polymer. The aromatic ester repeating units may be generally represented by the following Formula (I):

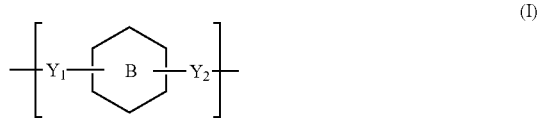

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and
$Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl) butane, bis(4-carboxyphenyl) ethane, bis(3-carboxyphenyl) ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) each typically constitute from about 1 mol. % to about 40 mol. %, in some embodiments from about 2 mol. % to about 30 mol. %, and in some embodiments, from about 5 mol. % to about 25 mol. % of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 20 mol. % or more, in some embodiments about 25 mol. % or more, in some embodiments about 30 mol. % or more, in some embodiments about 40 mol. % or more, in some embodiments about 50 mole % or more, in some embodiments from about 55 mol. % to 100 mol. %, and in some embodiments, from about 60 mol. % to about 95 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl) ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 50 mol. %, in some embodiments from about 1 mol. % to about 40 mol. %, in some embodiments from about 2 mol. % to about 40 mol. %, in some embodiments from about 5 mol. % to about 35 mol. %, and in some embodiments, from about 5 mol. % to about 25 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "high naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) may be about 10 mol. % or more, in some embodiments about 12 mol. % or more, in some embodiments about 15 mol. % or more, in some embodiments about 18 mol. % or more, in some embodiments about 30 mol. % or more, in some embodiments about 40 mol. % or more, in some embodiments about 45 mol. % or more, in some embodiments 50 mol. % or more, in some embodiments about 55 mol. % or more, and in some embodiments, from about 55 mol. % to about 95 mol. % of the polymer. Without intending to be limited by theory, it is believed that such "high naphthenic" polymers are capable of reducing the tendency of the polymer composition to absorb water, which can help stabilize the dielectric constant and dissipation factor at high frequency ranges. Namely, such high naphthenic polymers typically have a water adsorption of about 0.015% or less, in some embodiments about 0.01% or less, and in some embodiments, from about 0.0001% to about 0.008% after being immersed in water for 24 hours in accordance with ISO 62-1:2008. The high naphthenic polymers may also have a moisture adsorption of about 0.01% or less, in some embodiments about 0.008% or less, and in some embodiments, from about 0.0001% to about 0.006% after being exposed to a humid atmosphere (50% relative humidity) at a temperature of 23° C. in accordance with ISO 62-4:2008.

In one embodiment, for instance, the repeating units derived from HNA may constitute 30 mol. % or more, in some embodiments about 40 mol. % or more, in some embodiments about 45 mol. % or more, in some embodiments 50 mol. % or more, in some embodiments about 55 mol. % or more, and in some embodiments, from about 55 mol. % to about 95 mol. % of the polymer. In such embodiments, the liquid crystalline polymer may contain various other monomers, such as aromatic hydroxycarboxylic acid(s) (e.g., HBA) in an amount of from about 1 mol. % to about 50 mol. %, and in some embodiments from about 1 mol. % to about 20 mol. %, and in some embodiments, from about 2 mol. % to about 10 mol. %; aromatic dicarboxylic acid(s) (e.g., IA and/or TA) in an amount of from about 1 mol. % to about 40 mol. %, and in some embodiments, from about 5 mol. % to about 25 mol. %; and/or aromatic diol(s) (e.g., BP and/or HQ) in an amount of from about 1 mol. % to about 40 mol. %, and in some embodiments, from about 5 mol. % to about 25 mol. %. In another embodiment, the repeating units derived from NDA may constitute 10 mol. % or more, in some embodiments about 12 mol. % or more, in some embodiments about 15 mol. % or more, and in some embodiments, from about 18 mol. % to about 95 mol. % of the polymer. In such embodiments, the liquid crystalline polymer may also contain various other monomers, such as aromatic hydroxycarboxylic acid(s) (e.g., HBA) in an amount of from about 20 mol. % to about 60 mol. %, and in some embodiments, from about 30 mol. % to about 50 mol. %; aromatic dicarboxylic acid(s) (e.g., IA and/or TA) in an amount of from about 2 mol. % to about 30 mol. %, and in some embodiments, from about 5 mol. % to about 25 mol. %; and/or aromatic diol(s) (e.g., BP and/or HQ) in an amount of from about 2 mol. % to about 40 mol. %, and in some embodiments, from about 5 mol. % to about 35 mol. %.

Also, although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 10 mol. %, in some embodiments no more than about 15 mol. %, in some embodiments no more than about 8 mol. %, in some embodiments no more than about 6 mol. %, and in some embodiments from 1 mol. % to about 5 mol. % of the polymer (e.g., 0 mol. %). In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments from about 45 mol. % to about 70 mol. % of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments from about 15 mol. % to about 35 mol. % of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments from about 5 mol. % to about 20 mol. % of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments from about 3 mol. % to about 25 mol. % when employed.

In certain embodiments, all of the liquid crystalline polymers employed in the polymer composition are "high naphthenic" polymers such as described above. In other embodiments, however, "low naphthenic" liquid crystalline polymers may also be employed in the composition in which the total amount of repeating units derived from naphthenic hydroxycarboxylic and/or dicarboxylic acids (e.g., NDA, HNA, or a combination of HNA and NDA) is less than 10 mol. %, in some embodiments about 8 mol. % or less, in some embodiments about 6 mol. % or less, and in some embodiments, from about 1 mol. % to about 5 mol. % of the polymer. When employed, it is generally desired that such low naphthenic polymers are present in only a relatively low amount. For example, when employed, low naphthenic liquid crystalline polymers typically constitute from about 1 wt. % to about 50 wt. %, in some embodiments from about 2 wt. % to about 40 wt. %, and in some embodiments, from about 5 wt. % to about 30 wt. % of the total amount of liquid crystalline polymers in the composition, and from about 0.5 wt. % to about 45 wt. %, in some embodiments from about 2 wt. % to about 35 wt. %, and in some embodiments, from about 5 wt. % to about 25 wt. % of the entire composition. Conversely, high naphthenic liquid crystalline polymers typically constitute from about 50 wt. % to about 99 wt. %, in some embodiments from about 60 wt. % to about 98 wt. %, and in some embodiments, from about 70 wt. % to about 95 wt. % of the total amount of liquid crystalline polymers in the composition, and from about 55 wt. % to about 99.5 wt. %, in some embodiments from about 65 wt. % to about 98 wt. %, and in some embodiments, from about 75 wt. % to about 95 wt. % of the entire composition.

In certain embodiments, it may desirable to employ a blend of polymers within the polymer matrix. For instance, the polymer matrix may contain a first polymer that has a faster crystallization rate than a second polymer. In one embodiment, the first polymer may include a polyethylene terephthalate and the second polymer may include a polybutylene terephthalate polymer. Combining polymers with different crystallization rates may provide various advantages and benefits. For instance, a slower crystallizing polymer (e.g., polybutylene terephthalate) can have a tendency to migrate to the surface of a part and provide good surface gloss and aesthetics, while a faster crystallizing polymer (e.g., polyethylene terephthalate) can enhance mechanical properties. When such a blend is employed, it is typically desired that the first polymer is present in an amount greater than the second polymer. For example, the weight ratio of the first polymer to the second polymer may be from about 1 to about 20, in some embodiments from about 2 to about 15, and in some embodiments from about 3 to about 10. The first polymer may, for instance, constitute from about 10 wt. % to about 40 wt. %, in some embodiments from about 15 wt. % to about 35 wt. %, and in some embodiments from about 20 wt. % to about 30 wt. %, while the second polymer may constitute from about 1 wt. % to about 10 wt. %, in some embodiments from about 2 wt. % to about 9 wt. %, and in some embodiments from about 3 wt. % to about 8 wt. % of the polymer composition.

The polymers within the polymer matrix may be present in an amount of about 30 wt. % or more, in some embodiments about 40 wt. % or more, in some embodiments from about 40 wt. % to about 99.5 wt. %, in some embodiments from about 50 wt. % to about 95 wt. %, in some embodiments, from about 60 wt. % to about 90 wt. %, and in some embodiments, from about 60 wt. % to about 85 wt. % of the polymer composition.

B. Hollow Inorganic Fillers

To help achieve the desired dielectric properties, the polymer composition may include hollow inorganic fillers. For instance, these fillers may have a dielectric constant of about 3.0 or less, in some embodiments about 2.5 or less, in some embodiments from about 1.1 to about 2.3, and in some embodiments from about 1.2 to about 2.0 at 100 MHz. In addition, the hollow inorganic fillers may have a certain size and contribute to the strength of the polymer composition may also allowing the polymer composition to have a reduced weight and/or density because of the hollow nature.

In general, the hollow inorganic fillers have an interior hollow space or cavity and may be synthesized using techniques known in the art. The hollow inorganic fillers may be made from conventional materials. For instance, the hollow inorganic fillers may include alumina, silica, zirconia, magnesia, glass, fly ash, borate, phosphate, ceramic, and the like. In one embodiment, the hollow inorganic fillers may include hollow glass fillers, hollow ceramic fillers, and mixtures thereof. In one embodiment, the hollow inorganic fillers include hollow glass fillers.

The hollow glass fillers may be made from a soda lime borosilicate glass, a soda lime glass, a borosilicate glass, a sodium borosilicate glass, a sodium silicate glass, or an aluminosilicate glass. In this regard, in one embodiment, the composition of the glass, while not limited, may be at least about 65% by weight of $SiO_2$, 3-15% by weight of $Na_2O$, 8-15% by weight of CaO, 0.1-5% by weight of MgO, 0.01-3% by weight of $Al_2O_3$, 0.01-1% by weight of $K_2O$, and optionally other oxides (e.g., $Li_2O$, $Fe_2O_3$, $TiO_2$, $B_2O_3$). In another embodiment, the composition may be about 50-58% by weight of $SiO_2$, 25-30% by weight of $Al_2O_3$, 6-10% by weight of CaO, 1-4% by weight of $Na_2O/K_2O$, and 1-5% by weight of other oxides. Also, in one embodiment, the hollow glass fillers may include more alkaline earth metal oxides than alkali metal oxides. For example, the weight ratio of the alkaline earth metal oxides to the alkali metal oxides may be more than 1, in some embodiments about 1.1 or more, in some embodiments about 1.2 to about 4, and in some embodiments from about 1.5 to about 3. Regardless of the above, it should be understood that the glass composition may vary depending on the type of glass utilized and still provide the benefits as desired by the present invention.

The hollow inorganic fillers may have at least one dimension having an average value that is about 1 micrometers or more, in some embodiments about 5 micrometers or more, in some embodiments about 8 micrometers or more, in some embodiments from about 1 micrometer to about 150 micrometers, in some embodiments from about 10 micrometers to about 150 micrometers, and in some embodiments from about 12 micrometers to about 50 micrometers. In one embodiment, such average value may refer to a $d_{50}$ value.

Furthermore, the hollow inorganic fillers may have a $D_{10}$ of about 3 micrometers or more, in some embodiments about 4 micrometers or more, in some embodiments from about 5 micrometers to about 20 micrometers, and in some embodiments from about 6 micrometers to about 15 micrometers. The hollow inorganic fillers may have a $D_{90}$ of about 10 micrometers or more, in some embodiments about 15 micrometers or more, in some embodiments from about 20 micrometers to about 150 micrometers, and in some embodiments from about 22 micrometers to about 50 micrometers.

In this regard, the hollow inorganic fillers may be present in a size distribution, which may be a Gaussian, normal, or non-normal size distribution. In one embodiment, the hollow inorganic fillers may have a Gaussian size distribution. In another embodiment, the hollow inorganic fillers may have a normal size distribution. In a further embodiment, the hollow inorganic fillers may have a non-normal size distribution. Examples of non-normal size distributions may include unimodal and multi-modal (e.g., bimodal) size distributions.

When referring to dimensions above, such dimension may be any dimension. In one embodiment, however, such dimension refers to a diameter. For example, such value for the dimension refers to an average diameter of spheres. The dimension, such as the average diameter, may be determined in accordance to 3M QCM 193.0. In this regard, in one embodiment, the hollow inorganic fillers may be referring to hollow spheres such as hollow glass spheres. For instance, the hollow inorganic fillers may have an average aspect ratio of approximately 1. In general, the average aspect ratio may be about 0.8 or more, in some embodiments about 0.85 or more, in some embodiments from about 0.9 to about 1.3, and in some embodiments from about 0.95 to about 1.05.

In addition, the hollow inorganic fillers may have relatively thin walls to help with the dielectric properties of the polymer composition as well as the reduction in weight. The thickness of the wall may be about 50% or less, in some embodiments about 40% or less, in some embodiments from about 1% to about 30%, and in some embodiments from about 2% to about 25% the average dimension, such as the average diameter, of the hollow inorganic fillers.

In addition, the hollow inorganic fillers may have a certain true density that can allow for easy handling and provide a polymer composition having a reduction in weight. In general, the true density refers to the quotient obtained by dividing the mass of a sample of the hollow fillers by the true volume of that mass of hollow fillers wherein the true volume is referred to as the aggregate total volume of the hollow fillers. In this regard, the true density of the hollow inorganic fillers may be about 0.1 g/cm$^3$ or more, in some embodiments about 0.2 g/cm$^3$ or more, in some embodiments from about 0.3 g/cm$^3$ or more to about 1.2 g/cm$^3$, and in some embodiments from about 0.4 g/cm$^3$ or more to about 0.9 g/cm$^3$. The true density may be determined in accordance to 3M QCM 14.24.1.

Even though the fillers are hollow, they may have a mechanical strength that allows for maintaining the integrity of the structure of the fillers resulting in a lower likelihood of the fillers being broken during processing and/or use. In this regard, the isotactic crush resistance (i.e., wherein at least 80 vol. %, such as at least 90 vol. % of the hollow fillers survive) of the hollow inorganic fillers may be about 20 MPa or more, in some embodiments about 100 MPa or more, in some embodiments from about 150 MPa to about 500 MPa, and in some embodiments from about 200 MPa to about 350 MPa. The isotactic crush resistance may be determined in accordance to 3M QCM 14.1.8.

The alkalinity of the hollow inorganic fillers may be about 1.0 meq/g or less, in some embodiments about 0.9 meq/g or less, in some embodiments from about 0.1 meq/g to about 0.8 meq/g, and in some embodiments from about 0.2 meq/g to about 0.7 meq/g. The alkalinity may be determined in accordance to 3M QCM 55.19. In order to provide a relatively low alkalinity, the hollow inorganic fillers may be treated with a suitable acid, such as a phosphoric acid.

In addition, the hollow inorganic fillers may also include a surface treatment to assist with providing a better compatibility with the polymer and/or other components within the polymer composition. As an example, the surface treatment may be a silanization. In particular, the surface treatment agents may include, but are not limited to, aminosilanes, epoxysilanes, and the like.

The hollow inorganic fillers may, for instance, constitute about 1 wt. % or more, in some embodiments about 4 wt. % or more, in some embodiments from about 5 wt. % to about 40 wt. %, and in some embodiments from about 10 wt. % to about 30 wt. % of the polymer composition. Furthermore, to provide beneficial properties, the weight ratio of polymer to the hollow inorganic filler may be about 0.1 or more, in some embodiments about 1 or more, in some embodiments about 1.5 or more, in some embodiments from about 0.1 to about 10, in some embodiments from about 1 to about 10, in some embodiments from about 2 to about 10, in some embodiments from about 2 to about 6, and in some embodiments from about 2 to about 5.

C. Dielectric Fillers

In addition, a dielectric filler may also be employed in the polymer composition to improve the properties of the polymer composition. For instance, the dielectric filler may also be one that is capable of reducing the dielectric constant of the polymer composition. In addition, the dielectric filler may also contribute to improving other properties of the polymer composition. For example, the dielectric filler may also improve the thermal and mechanical properties of the polymer composition. These dielectric fillers may be dielectric inorganic fillers, dielectric organic fillers, or a mixture thereof. In one embodiment, the dielectric fillers may be inorganic dielectric fillers. In another embodiment, the dielectric fillers may be organic dielectric fillers. In a further embodiment, the dielectric fillers may be a mixture of inorganic dielectric fillers and organic dielectric fillers. Furthermore, in one embodiment, these dielectric fillers may be solid fillers such that they do not have an interior cavity. These dielectric fillers may constitute about 1 wt. % or more, in some embodiments about 2 wt. % or more, in some embodiments from about 3 wt. % to about 40 wt. %, and in some embodiments from about 5 wt. % to about 25 wt. % of the polymer composition. Furthermore, because the hollow inorganic filler and the dielectric filler each have their own attributes, utilizing them in combination within a certain ratio may provide a polymer composition with beneficial properties, such as a desired balance among dielectric, thermal, and/or mechanical properties. In this regard, the weight ratio of the hollow inorganic fillers to the dielectric fillers may be about 0.1 or more, in some embodiments about 0.1 to about 10, in some embodiments from about 0.1 to about 5, in some embodiments from about 0.5 to about 4, and in some embodiments from about 1 to about 2.

The particular nature of the dielectric filler may vary as desired. For example, in one embodiment, the dielectric filler may be a fibrous filler. The fibrous filler typically includes fibers having a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments from about 3,000 MPa to about 6,000 MPa. To help maintain the desired dielectric properties, such high strength fibers may be formed from materials that are generally insulative in nature, such as glass, ceramics or minerals (e.g., alumina or silica), aramids (e.g., Kevler® marketed by E. I. duPont de Nemours, Wilmington, Del.), minerals, polyolefins, polyesters, etc. In one embodiment, the fibrous filler may include glass fibers, mineral fibers, or a mixture thereof. For instance, in one embodiment, the fibrous filler may include glass fibers. The glass fibers particularly suitable may include E-glass, A-glass, C-glass, D-glass, AR-glass, R-glass, S1-glass, S2-glass, etc. In another embodiment, the fibrous filler may include mineral fibers. The mineral fibers may include those derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are inosilicates, such as wollastonite fibers available from Nyco Minerals under the trade designation NYGLOS® (e.g., NYGLOS® 4 W or NYGLOS® 8).

Further, although the fibrous fillers may have a variety of different sizes, fibers having a certain aspect ratio can help improve the mechanical properties of the polymer composition. That is, fibrous fillers having an aspect ratio (average length divided by nominal diameter) of about 2 or more, in some embodiments about 4 or more, in some embodiments from about 5 to about 50, and in some embodiments from about 8 to about 40 may be particularly beneficial. Such fibrous fillers may, for instance, have a weight average length of about 10 micrometer or more, in some embodiments about 25 micrometers or more, in some embodiments from about 50 micrometers or more to about 800 micrometers or less, and in some embodiments from about 60 micrometers to about 500 micrometers. Also, such fibrous fillers may, for instance, have a volume average length of about 10 micrometer or more, in some embodiments about 25 micrometers or more, in some embodiments from about 50 micrometers or more to about 800 micrometers or less, and in some embodiments from about 60 micrometers to about 500 micrometers. The fibrous fillers may likewise have a nominal diameter of about 5 micrometers or more, in some embodiments about 6 micrometers or more, in some embodiments from about 8 micrometers to about 40 micrometers, and in some embodiments from about 9 micrometers to about 20 micrometers. The relative amount of the fibrous filler may also be selectively controlled to help achieve the desired mechanical and thermal properties without adversely impacting other properties of the polymer composition, such as its flowability and dielectric properties, etc. In this regard, the fibrous fillers may have a dielectric constant of about 6 or less, in some embodiments about 5.5 or less, in some embodiments from about 1.1 to about 5, and in some embodiments from about 2 to about 4.8 at a frequency of 1 GHz.

The fibrous filler may be in a modified or an unmodified form, e.g., provided with a sizing, or chemically treated, in order to improve adhesion to the plastic. In some examples, glass fibers may be provided with a sizing to protect the glass fiber, to smooth the fiber but also to improve the adhesion between the fiber and a matrix material. If present, a sizing may comprise silanes, film forming agents, lubricants, wetting agents, adhesive agents optionally antistatic agents and plasticizers, emulsifiers and optionally further additives. In one particular embodiment, the sizing may include a silane. Specific examples of silanes are aminosilanes, e.g., 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino) propyltrimethoxysilane, N-[3-(trimethoxysilyl)propyl]-1,2-ethane-diamine.

If desired, the dielectric filler may also include a particulate filler. Particulate fillers may also be employed in the polymer composition as a dielectric filler to help achieve the desired properties and/or color. Particulate clay minerals may be particularly suitable for use in the present invention. Examples of such clay minerals include, for instance, talc ($Mg_3Si_4O_{10}(OH_2)$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite (($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite $Mg,Al)_2Si_4O_{10}(OH) \cdot 4 (H_2O)$), pyrophyllite ($Al_2Si_4O_{10}(OH)_2$), etc., as well as combinations thereof. In lieu of, or in addition to, clay minerals, still other particulate fillers may also be employed. For example, other suitable particulate silicate fillers may also be employed, such as mica, diatomaceous earth, and so forth. Mica, for instance, may be a particularly suitable mineral for use in the present invention. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof. Other types of mineral particulate fillers may also be employed, such as silica, alumina, etc.

The particulate filler may be in a modified or an unmodified form, e.g., provided with a treatment to improve the properties. In some examples, particulate filler may be fluorinated, for example as a coating. The fluorinated additive may be utilized to improve the processing of the polymer composition, such as by providing better mold filling, internal lubrication, mold release, etc. In certain embodiments, the fluorinated additive may include a fluoropolymer, which contains a hydrocarbon backbone polymer in which some or all of the hydrogen atoms are substituted with fluorine atoms. The backbone polymer may be polyolefinic and formed from fluorine-substituted, unsaturated olefin monomers. The fluoropolymer can be a homopolymer of such fluorine-substituted monomers or a copolymer of fluorine-substituted monomers or mixtures of fluorine-substituted monomers and non-fluorine-substituted monomers. Along with fluorine atoms, the fluoropolymer can also be substituted with other halogen atoms, such as chlorine and bromine atoms. Representative monomers suitable for forming fluoropolymers for use in this invention are tetrafluoroethylene, vinylidene fluoride, hexafluoropropylene, chlorotrifluoroethylene, perfluoroethylvinyl ether, perfluoromethylvinyl ether, perfluoropropylvinyl ether, etc., as well as mixtures thereof. Specific examples of suitable fluoropolymers include polytetrafluoroethylene, perfluoroalkylvinyl ether, poly(tetrafluoroethylene-co-perfluoroalkyvinylether), fluorinated ethylene-propylene copolymer, ethylene-tetrafluoroethylene copolymer, polyvinylidene fluoride, polychlorotrifluoroethylene, etc., as well as mixtures thereof. The fluorinated additive may contain only the fluoropolymer, or it may also include other ingredients, such as those that aid in its ability to be uniformly dispersed within the polymer composition. In one embodiment, for example, the fluorinated additive may include a fluoropolymer in combination with a plurality of carrier particles. In such embodiments, for instance, the fluoropolymer may be coated onto the carrier particles, such as the particulate fillers mentioned above.

D. Functional Compounds

If desired, functional compounds may also be employed in the polymer composition to, among other things, help reduce the melt viscosity of the polymer composition. For example, the functional compound may be a functional aromatic compound, a non-aromatic functional compound, or a mixture thereof. In one embodiment, for example, the polymer composition may include a non-aromatic functional compound. Such compounds may serve a variety of purposes, such as reducing melt viscosity. One such non-aromatic functional compound is water. If desired, water can be added in a form that under process conditions generates water. For example, the water can be added as a hydrate that under the process conditions (e.g., high temperature) effectively "loses" water. Such hydrates include alumina trihydrate, copper sulfate pentahydrate, barium chloride dihydrate, calcium sulfate dehydrate, etc., as well as combinations thereof. In one particular embodiment, the hydrate may include alumina trihydrate. When employed, the functional compounds, such as the hydrates, may constitute about 0.001 wt. % or more, in some embodiments about 0.005 wt. % or more, in some embodiments from about 0.005 wt. % to about 2 wt. %, and in some embodiments from about 0.01 wt. % to about 1 wt. % of the polymer composition.

E. Laser Activatable Additive

The polymer composition may be "laser activatable" in the sense that it contains an additive that can be activated by a laser direct structuring ("LDS") process. In such a process, the additive is exposed to a laser that causes the release of metals. The laser thus draws the pattern of conductive elements onto the part and leaves behind a roughened surface containing embedded metal particles. These particles act as nuclei for the crystal growth during a subsequent plating process (e.g., copper plating, gold plating, nickel plating, silver plating, zinc plating, tin plating, etc.).

The laser activatable additive generally includes spinel crystals, which may include two or more metal oxide cluster configurations within a definable crystal formation. For example, the overall crystal formation may have the following general formula:

$$AB_2O_4$$

wherein,

A is a metal cation having a valance of 2, such as cadmium, chromium, manganese, nickel, zinc, copper, cobalt, iron, magnesium, tin, titanium, etc., as well as combinations thereof; and B is a metal cation having a valance of 3, such as chromium, iron, aluminum, nickel, manganese, tin, etc., as well as combinations thereof.

Typically, A in the formula above provides the primary cation component of a first metal oxide cluster and B provides the primary cation component of a second metal oxide cluster. These oxide clusters may have the same or different structures. In one embodiment, for example, the first metal oxide cluster has a tetrahedral structure and the second metal oxide cluster has an octahedral cluster. Regardless, the clusters may together provide a singular identifiable crystal type structure having heightened susceptibility to electromagnetic radiation. Examples of suitable spinel crystals include, for instance, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, etc. Copper chromium oxide ($CuCr_2O_4$) is particularly suitable for use in the present invention and is available from Shepherd Color Co. under the designation "Shepherd Black 1GM."

Laser activatable additives may constitute from about 0.1 wt. % to about 30 wt. %, in some embodiments from about 0.5 wt. % to about 20 wt. %, and in some embodiments, from about 1 wt. % to about 10 wt. % of the polymer composition.

F. Other Additives

A wide variety of additional additives can also be included in the polymer composition, such as lubricants, thermally conductive fillers, pigments, antioxidants, stabilizers, surfactants, waxes, flame retardants, anti-drip additives, nucleating agents (e.g., boron nitride), flow modifiers, coupling agents, antimicrobials, pigments or other colorants, impact modifiers, and other materials added to enhance properties and processability. Such optional materials may be employed in the polymer composition in conventional amounts and according to conventional processing techniques. When employed, for example, such additive(s) typically constitute from about 0.05 wt. % to about 5 wt. %, and in some embodiments from about 0.1 wt. % to about 1 wt. % of the polymer composition.

In one embodiment, the polymer composition may include a lubricant. For example, the lubricant may include polyolefin waxes (e.g., polyethylene wax), amide waxes, fatty acid ester waxes, etc. In one embodiment, the lubricant may include a polyolefin wax, such as a polyethylene wax. The lubricant may also be a fatty acid ester wax. Fatty acid ester waxes may, for instance, be obtained by oxidative bleaching of a crude natural wax and subsequent esterification of the fatty acids with an alcohol. The alcohol may, in some cases, have 1 to 4 hydroxyl groups and 2 to 20 carbon atoms. When the alcohol is multifunctional (e.g., 2 to 4 hydroxyl groups), a carbon atom number of 2 to 8 is particularly desired. Particularly suitable multifunctional alcohols may include dihydric alcohol (e.g., ethylene glycol, propylene glycol, butylene glycol, 1,3-propanediol, 1,4-butanediol, 1,6-hexanediol and 1,4-cyclohexanediol), trihydric alcohol (e.g., glycerol and trimethylolpropane), tetrahydric alcohols (e.g., pentaerythritol and erythritol), and so forth. Aromatic alcohols may also be suitable, such as o-, m- and p-tolylcarbinol, chlorobenzyl alcohol, bromobenzyl alcohol, 2,4-dimethylbenzyl alcohol, 3,5-dimethylbenzyl alcohol, 2,3,5-cumobenzyl alcohol, 3,4,5-trimethylbenzyl alcohol, p-cuminyl alcohol, 1,2-phthalyl alcohol, 1,3-bis(hydroxymethyl)benzene, 1,4-bis(hydroxymethyl)benzene, pseudocumenyl glycol, mesitylene glycol and mesitylene glycerol. Particularly suitable fatty acid esters for use in the present invention are derived from montanic waxes. Licowax® OP (Clariant), for instance, contains montanic acids partially esterified with butylene glycol and montanic acids partially saponified with calcium hydroxide. Thus, Licowax® OP contains a mixture of montanic acid esters and calcium montanate. Other montanic acid esters that may be employed include Licowax® E, Licowax® OP, and Licolub® WE 4 (all from Clariant), for instance, are montanic esters obtained as secondary products from the oxidative refining of raw montan wax. Licowax® E and Licolub®WE 4 contain montanic acids esterified with ethylene glycol or glycerine.

In one embodiment, the polymer composition may include a black pigment. The black pigment generally includes a plurality of carbon black particles, such as furnace black, channel black, acetylene black, lamp black, etc. The carbon black particles may have any desired shape, such as a granular, flake (scaly), etc. The average size (e.g., diameter) of the particles may, for instance, range from about 1 to about 200 nanometers, in some embodiments from about 5 to about 150 nanometers, and in some embodiments from about 10 to about 100 nanometers. It is also typically desired that the carbon black particles are relatively pure, such as containing polynuclear aromatic hydrocarbons (e.g., benzo[a]pyrene, naphthalene, etc.) in an amount of about 1 part per million ("ppm") or less, and in some embodiments about 0.5 ppm or less. For example, the black pigment may contain benzo[a]pyrene in an amount of about 10 parts per billion ("ppb") or less, and in some embodiments about 5 ppb or less.

If desired, the black pigment may include a carrier resin that can encapsulate the carbon black particles, thereby providing a variety of benefits. For example, the carrier resin can enhance the ability of the particles to be handled and incorporated into the base polymer composition. While any known carrier resin may be employed for this purpose, in particular embodiments, the carrier resin may be the same as the polymer employed in the polymer matrix of the polymer composition. If desired, the carrier resin may be pre-blended with the carbon black particles to form a pigment masterbatch, which can later be combined with the polymer. When employed, the carrier resin typically constitutes from about 50 wt. % to about 95 wt. %, in some embodiments about 60 wt. % to about 90 wt. %, and in some embodiments from about 70 wt. % to about 85 wt. % of the masterbatch, and the carbon black particles typically constitute from about 5 wt. % to about 50 wt. %, in some embodiments from about 10 wt. % to about 40 wt. %, and in some embodiments from about 15 wt. % to about 30 wt. % of the masterbatch. Of course, other components may also be incorporated into the masterbatch.

II. Formation

The components used to form the polymer composition may be combined together using any of a variety of different techniques as is known in the art. In one particular embodiment, for example, the polymer, optionally the hollow inorganic filler and/or dielectric filler, and other optional additives are melt processed as a mixture within an extruder to form the polymer composition. The mixture may be melt-kneaded in a single-screw or multi-screw extruder at a temperature of from about 250° C. to about 450° C. In one embodiment, the mixture may be melt processed in an extruder that includes multiple temperature zones. The temperature of individual zones is typically set within about −60° C. to about 25° C. relative to the melting temperature of the polymer. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. For example, the polymer may be applied at the feed throat, and certain additives (e.g., hollow inorganic filler, dielectric filler, and/or other optional additives) may be supplied at the same or different temperature zone located downstream therefrom. Regardless, the resulting mixture can be melted and mixed then extruded through a die. The extruded polymer composition can then be quenched in a water bath to solidify and granulated in a pelletizer followed by drying.

The melt viscosity of the polymer composition is generally low enough that it can readily flow into the cavity of a mold to form the small-sized circuit substrate. For example, in one particular embodiment, the polymer composition may have a melt viscosity of about 5 Pa-s or more, in some embodiments about 10 Pa-s or more, in some embodiments from about 10 Pa-s to about 500 Pa-s, in some embodiments from about 5 Pa-s to about 150 Pa-s, in some embodiments from about 5 Pa-s to about 100 Pa-s, in some embodiments from about 10 Pa-s to about 100 Pa-s, in some embodiments from about 15 to about 90 Pa-s, and in some embodiments from about 20 Pa-s to about 60 Pa-s, as determined at a shear rate of 1,000 seconds$^{-1}$ at a temperature of 20° C. higher than the melting temperature of the polymer. The melt viscosity may be determined in accordance with 11443: 2005.

Also, the polymer composition may have a relatively low density. For example, the density may be about 3 g/cm$^3$ or less, in some embodiments about 2.5 g/cm$^3$ or less, in some embodiments from about 0.1 g/cm$^3$ to about 2 g/cm$^3$, and in some embodiments from about 0.5 g/cm$^3$ to about 1.6 g/cm$^3$. The density may be determined in accordance with ISO 1183.

In addition, the polymer composition may have a certain X value as described in U.S. Pat. No. 6,495,616, which is incorporated herein by reference, and as defined by the following equation:

$$X=100\times[(100/\rho_0+\alpha/\rho_1+\beta/\rho_3)-(100+\alpha+\beta)/\rho](\alpha/\rho_1-\alpha/\rho_2)$$

wherein α represents the amount of the hollow inorganic fillers (part by weight based on 100 parts by weight of the polymer), β represents the amount of the dielectric (e.g., fibrous) fillers (part by weight based on 100 parts by weight of the polymer), $\rho_0$ represents the specific gravity of the polymer, $\rho_1$ represents the true specific gravity of the hollow inorganic fillers, $\rho_2$ represents the material specific gravity of the hollow inorganic fillers, $\rho_3$ represents the specific gravity of the dielectric (e.g., fibrous) fillers, and p represents the specific gravity of ASTM No. 4 dumbbell (having a thickness of 2.5 mm) obtained by injection molding of said polymer composition. In one embodiment, X may be from 10 to 50. In another embodiment, X may be less than 10 or greater than 50. For example. In one embodiment, X may be less than 10. In another embodiment, X may be greater than 50.

III. Molded Parts

Once formed, the polymer composition may be molded into a desired shape for a particular application. Typically, the shaped parts are molded using a one-component injection molding process in which dried and preheated plastic granules are injected into the mold. In one embodiment, the molded part or shape may be an electrical connector as mentioned above. The electrical connector may find particular application with 5G radio frequency systems.

Figure 3:
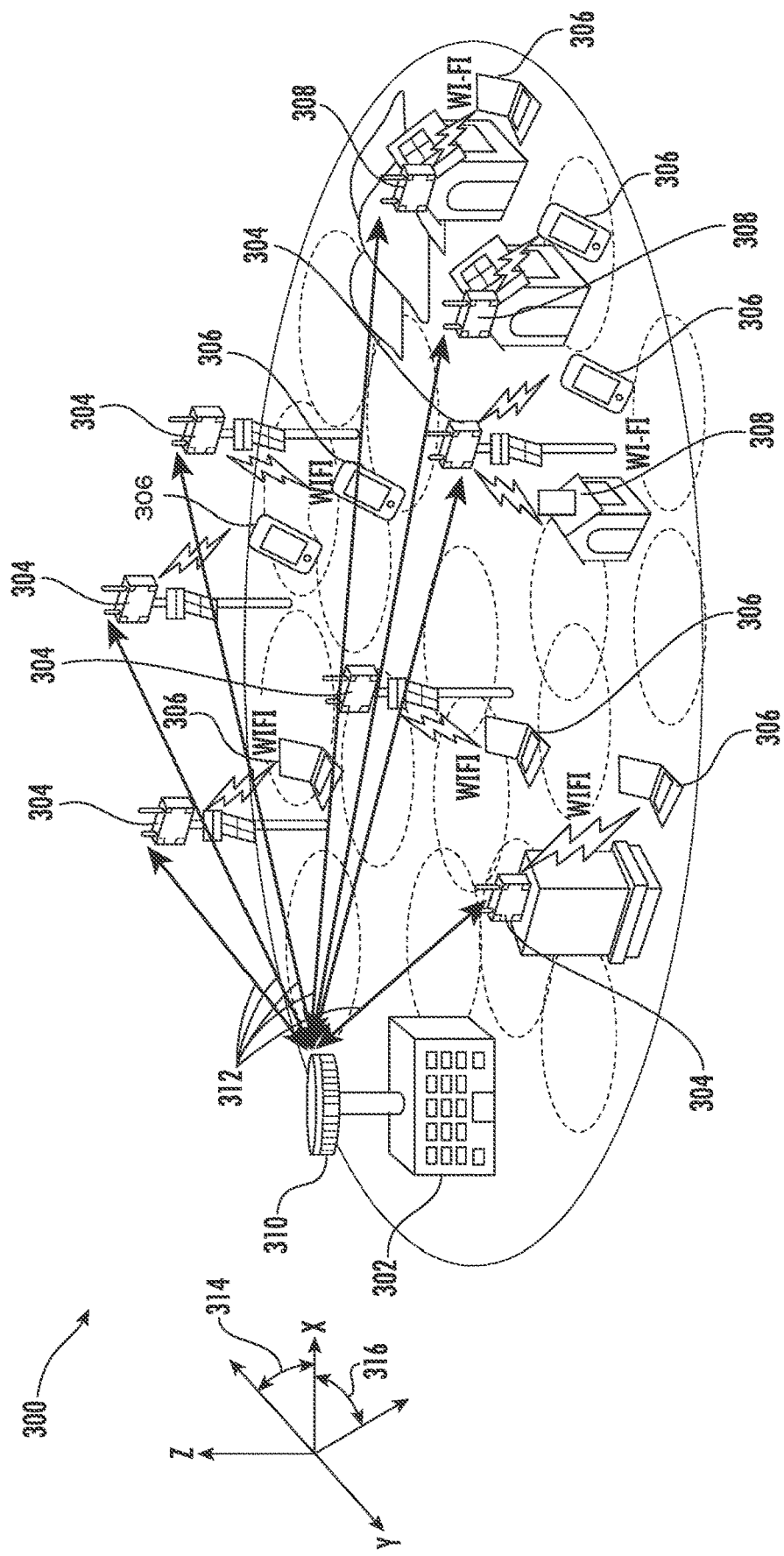
FIG. 3 depicts a 5G communication system including a base station, relay stations, user computing devices, and Wi-Fi repeaters.

Referring to FIG. 3, for instance, one embodiment of a 5G communication system 300 can include a base station 302, one or more relay stations 304, one or more user computing devices 306, one or more Wi-Fi repeaters 308 (e.g., "femtocells"), and/or other suitable antenna components for the 5G antenna system 300. The relay stations 304 can be configured to facilitate communication with the base station 302 by the user computing devices 306 and/or other relay stations 304 by relaying or "repeating" signals between the base station 302 and the user computing devices 306 and/or relay stations 304. The base station 302 can include a MIMO antenna array 310 configured to receive and/or transmit radio frequency signals 312 with the relay station(s) 304, Wi-Fi repeaters 308, and/or directly with the user computing device(s) 306. The user computing device 306 is not necessarily limited by the present invention and include devices such as 5G smartphones.

The MIMO antenna array 310 can employ beam steering to focus or direct radio frequency signals 312 with respect to the relay stations 304. For example, the MIMO antenna array 310 can be configured to adjust an elevation angle 314 with respect to an X-Y plane and/or a heading angle 316 defined in the Z-Y plane and with respect to the Z direction.

Similarly, one or more of the relay stations 304, user computing devices 306, Wi-Fi repeaters 308 can employ beam steering to improve reception and/or transmission ability with respect to MIMO antenna array 310 by directionally tuning sensitivity and/or power transmission of the device 304, 306, 308 with respect to the MIMO antenna array 310 of the base station 302 (e.g., by adjusting one or both of a relative elevation angle and/or relative azimuth angle of the respective devices).

The electrical connector can be employed to communicatively couple the various elements of the base station(s) 302, relay station(s) 304, and/or user computing devices

306. For example, the base station(s) 302, relay station(s) 304, and/or user computing devices 306. Such antennas and/or antenna arrays can be communicatively coupled with one or more integrated circuits, processors, memory, etc. For example, a front end module can be used to control transmission and/or reception of radio frequency signals using the antennas and/or antenna arrays. The electrical connector can communicatively couple any of the devices above.

The present invention may be better understood with reference to the following examples.

Test Methods

Melt Viscosity:

The melt viscosity (Pa-s) may be determined in accordance with ISO Test No. 11443:2005 at a shear rate of 1,000 s$^{-1}$ and temperature 15° C. above the melting temperature (e.g., about 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation:

Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be about 23° C., and the testing speeds may be 1 or 5 mm/min.

Flexural Modulus, Flexural Stress, and Flexural Elongation:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be about 23° C. and the testing speed may be 2 mm/min.

Unnotched and Notched Charpy Impact Strength:

Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be about 23° C.

Dielectric Constant ("Dk") and Dissipation Factor ("Df"):

The dielectric constant (or relative static permittivity) and dissipation factor are determined using a known split-post dielectric resonator technique, such as described in Baker-Jarvis, et al., IEEE Trans. on Dielectric and Electrical Insulation, 5(4), p. 571 (1998) and Krupka, et al., Proc. 7th International Conference on Dielectric Materials: Measurements and Applications, IEEE Conference Publication No. 430 (September 1996). More particularly, a plaque sample having a size of 80 mm×80 mm×1 mm was inserted between two fixed dielectric resonators. The resonator measured the permittivity component in the plane of the specimen. Five (5) samples are tested and the average value is recorded. The split-post resonator can be used to make dielectric measurements in the low gigahertz region, such as 1 GHz, 2 GHz or 10 GHz.

Example 1

Samples 1-5 are formed from liquid crystalline polymers (LCP 1 or LCP 2), hollow glass spheres, as well as mica, wollastonite, glass powder, and/or glass fibers. LCP 1 is formed from 43% HBA, 9% TA, 29% HQ, and 20% NDA. LCP 2 is formed from 48% HNA, 2% HBA, 25% BP, and 25% TA. The hollow glass spheres had an average diameter of 18 micrometers. The glass powder had a dielectric constant of 4.8 as determined at a frequency of 1 GHz. Further, the glass fibers employed had an initial length of either 3 mm or 4 mm. The polymer compositions may also include a polyethylene lubricant, alumina trihydrate, pigments, and/or various other minor additives. Compounding was performed using a 25-mm single screw extruder.

TABLE 1

| Sample | 1 | 2 | 3 | 4 | 5 | 6 |
|---|---|---|---|---|---|---|
| LCP 1 | — | — | 77.3 | 67.3 | 67.3 | — |
| LCP 2 | 72.8 | 71.8 | — | — | — | 71.8 |
| Hollow Glass Spheres | 17 | 17 | 20 | 15 | 15 | 17 |
| Mica | — | — | — | 15 | — | — |
| Wollastonite | — | — | — | — | 15 | — |
| Glass Powder | — | 1 | — | — | — | 1 |
| Glass Fibers (4 mm length) | — | — | — | — | — | 10 |
| Glass Fibers (3 mm length) | 10 | 10 | — | — | — | — |
| Alumina Trihydrate | 0.2 | 0.2 | — | — | — | 0.2 |
| Polyethylene | — | — | 0.2 | 0.2 | 0.2 | — |
| Black Pigment Masterbatch | — | — | 2 | 2 | 2 | — |
| Other Additives | — | — | 0.5 | 0.5 | 0.5 | — |

The samples were then tested for thermal and mechanical properties. The results are set forth below in Table 2.

TABLE 2

| Sample | 1 | 2 | 3 | 4 | 5 | 6 |
|---|---|---|---|---|---|---|
| Dielectric Constant (10 GHz) | 3.03 | 3.01 | 3.0 | 3.2 | 3.2 | 2.93 |
| Dissipation Factor (10 GHz) | 0.002 | 0.002 | 0.003 | 0.003 | 0.003 | 0.003 |
| Dielectric Constant (2 GHz) | — | 2.99 | — | — | — | — |
| Dissipation Factor (2 GHz) | — | 0.002 | — | — | — | — |

TABLE 2-continued

| Sample | 1 | 2 | 3 | 4 | 5 | 6 |
|---|---|---|---|---|---|---|
| DTUL at 1.8 MPa (° C.) | 289 | 291 | 243 | 243 | 250 | — |
| Tensile Strength (MPa) | 78 | 86 | 77 | 66 | 65 | 99 |
| Flexural Strength (MPa) | 122 | — | — | — | — | — |
| Impact Strength (kJ/m$^2$) | 11 | 7 | 15 | 6 | 6 | — |
| Density (g/cm$^3$) | 1.22 | 1.18 | 1.14 | 1.27 | 1.28 | — |

Example 2

Sample 7 contains 100 wt. % LCP 3 for use in a connector, which is formed from 62% HNA, 2% HBA, 18% TA, and 18% BP. Samples are injection molded into plaques (60 mm×60 mm) and tested for thermal and mechanical properties. The results are set forth below.

TABLE 3

| | Sample 7 |
|---|---|
| Dk @ 10 GHz | 3.36 |
| Df @ 10 GHz | 0.0007 |
| Tensile strength (MPa) | 165 |
| Tensile modulus (MPa) | 15,382 |
| Tensile elongation (%) | 1.2 |
| Flexural strength (MPa) | 215 |
| Flexural modulus (MPa) | 15,792 |
| Charpy Notched (KJ/m$^2$) | 17.3 |
| DTUL at 1.8 MPa (° C.) | 313.5 |
| Melting Temperature (° C.) (1$^{st}$ heat of DSC) | 334 |

Example 3

Samples 8-15 are formed from various combinations of a liquid crystalline polymer (LCP 2), milled and/or flat chopped glass fiber strands (aspect ratio=4), mica (MICA 1 and MICA 2), and silica. MICA 1 had an average particle size of 25 micrometers and MICA had an average particle size of 60 micrometers. Compounding was performed using an 18-mm single screw extruder. Parts are injection molded the samples into plaques (60 mm×60 mm).

TABLE 4

| | 8 | 9 | 10 | 11 | 12 | 13 | 14 | 15 |
|---|---|---|---|---|---|---|---|---|
| LCP 2 | 78 | 68 | 78 | 78 | 68 | 78 | 68 | 80 |
| Milled Glass Fibers | — | 10 | — | — | 10 | — | — | — |
| Flat Glass Fibers | — | — | 10 | 15 | — | 10 | 10 | — |
| MICA 1 | 22 | 22 | 12 | 17 | — | — | — | 20 |
| MICA 2 | — | — | — | — | 22 | 12 | — | — |
| Silica | — | — | — | — | — | — | 12 | — |

Samples 8-15 were tested for thermal and mechanical properties. The results are set forth in the table below.

TABLE 5

| Sample | 8 | 9 | 10 | 11 | 12 | 13 | 14 | 15 |
|---|---|---|---|---|---|---|---|---|
| Dielectric Constant (2 GHz) | 3.96 | 3.95 | 3.96 | 4.03 | 4.04 | 4.07 | 3.67 | 3.7 |
| Dissipation Factor (2 GHz) | 0.0014 | 0.0015 | 0.0015 | 0.0021 | 0.0021 | 0.0019 | 0.0016 | 0.0009 |
| Dielectric Constant (10 GHz) | — | 4.03 | — | — | — | — | — | 3.78 |
| Dissipation Factor (10 GHz) | — | 0.0015 | — | — | — | — | — | 0.0078 |
| DTUL at 1.8 MPa (° C.) | — | — | — | — | — | — | — | 298 |
| Charpy Notched (kJ/m$^2$) | — | — | — | — | — | — | — | 8.6 |
| Charpy Unnotched (kJ/m$^2$) | — | — | — | — | — | — | — | — |
| Tensile Strength (MPa) | 142 | 146 | 124 | 134 | 128 | 134 | 121 | 179 |
| Tensile Modulus (MPa) | 13,731 | 14,422 | 13,385 | 13,851 | 13,578 | 14,691 | 10,186 | 12,795 |
| Tensile Elongation (%) | 1.96 | 1.64 | 1.39 | 1.74 | 1.57 | 1.37 | 2.1 | 2.3 |
| Flexural Strength (MPa) | 195 | 222 | 204 | 206 | 204 | 211 | 182 | 205 |
| Flexural Modulus (MPa) | 13,349 | 14,074 | 13,307 | 13,492 | 13,331 | 14,361 | 10,283 | 12,888 |
| Flexural Elongation (%) | 2.55 | 2.26 | 2.17 | 2.3 | 2.3 | 1.97 | 2.77 | 2.9 |
| Melt Viscosity (Pa-s) at 1,000 s$^{-1}$ | 38 | 48 | 44 | 39 | 36 | 52 | 56 | 25.8 |
| Melting Temperature (° C.) (1$^{st}$ heat of DSC) | 343 | 345 | 344 | 344 | 343 | 343 | 346 | 340 |

Example 4

Samples 8-15 are formed from various combinations of a liquid crystalline polymer (LCP 2), milled and/or flat chopped glass fiber strands (aspect ratio=4), mica (MICA 1 and MICA 2), and silica. MICA 1 had an average particle size of 25 micrometers and MICA 2 had an average particle size of 60 micrometers. Compounding was performed using an 18-mm single screw extruder. Parts are injection molded the samples into plaques (60 mm×60 mm).

TABLE 6

| Sample | 16 |
|---|---|
| LCP 2 | 49.8 |
| LCP 4 | 15.4 |
| Hollow Glass Spheres | 17.0 |
| Glass Powder | 1.0 |
| Glass Fibers (4 mm length) | 10.0 |
| Alumina Trihydrate | 0.2 |
| Copper Chromite | 6.6 |

The samples were then tested for thermal and mechanical properties. The results are set forth below in Table 7.

TABLE 7

| Sample | 16 |
|---|---|
| Dielectric Constant (2 GHz) | 3.07 |
| Dissipation Factor (2 GHz) | 0.0043 |
| Dielectric Constant (10 GHz) | 3.14 |
| Dissipation Factor (10 GHz) | 0.0035 |
| Melt Viscosity at 1,000 s$^{-1}$ (Pa-s) | 55.5 |
| Melt Viscosity at 400 s$^{-1}$ (Pa-s) | 88.9 |
| Melting Temperature (° C.) | 338.6 |
| DTUL at 1.8 MPa (° C.) | 217 |
| Tensile Strength (MPa) | 81 |
| Tensile Modulus (MPa) | 7,658 |
| Tensile Elongation (%) | 1.41 |
| Flexural Strength (MPa) | 116 |
| Flexural Modulus (MPa) | 7,241 |
| Flexural Elongation (%) | 1.91 |
| Charpy Notched Impact Strength (kJ/m$^2$) | 3.1 |
| Charpy Unnotched Impact Strength (kJ/m$^2$) | 7.3 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrical connector that comprises at least two opposing walls between which a passageway is defined for receiving a contact pin, wherein the walls have a width of about 500 micrometers or less, the walls being formed from a polymer composition that comprises a polymer matrix containing at least one liquid crystalline polymer having a glass transition temperature of about 30° C. or more in an amount of about 30 wt. % or more of the composition, wherein the polymer composition exhibits a dielectric constant of about 4 or less and a dissipation factor of about 0.02 or less, as determined at a frequency of 10 GHz, wherein the liquid crystalline polymer has a total amount of repeating units derived from naphthenic hydroxycarboxylic and/or naphthenic dicarboxylic acids of about 10 mol. % or more, repeating units derived from 4-hydroxybenzoic acid in an amount from about 1 mol. % to about 20 mol. %, and repeating units derived from aromatic dicarboxylic acids in an amount from 25 mol. % to about 30 mol. %, and wherein the polymer composition comprises a fibrous filler containing glass and having a dielectric constant of about 5.5 or less at a frequency of 1 GHz.

2. The electrical connector of claim 1, wherein the polymer composition exhibits a dielectric constant of about 3.5 or less and a dissipation factor of about 0.005 or less, as determined at a frequency of 10 GHz.

3. The electrical connector of claim 1, wherein the walls have a width of from about 200 to about 400 micrometers.

4. The electrical connector of claim 1, wherein the liquid crystalline polymer has a total amount of repeating units derived from naphthenic hydroxycarboxylic and/or naphthenic dicarboxylic acids of about 12 mol. % or more.

5. The electrical connector of claim 1, wherein the liquid crystalline polymer has a total amount of repeating units derived from naphthalene-2,6-dicarboxylic acid of about 10 mol. % or more.

6. The electrical connector of claim 1, wherein the liquid crystalline polymer contains repeating units derived from 6-hydroxy-2-naphthoic acid in an amount of about 30 mol. % or more.

7. The electrical connector of claim 1, wherein the liquid crystalline polymer contains repeating units derived from 6-hydroxy-2-naphthoic acid in an amount of about 50 mol. % or more.

8. The electrical connector of claim 1, wherein the liquid crystalline polymer is present in an amount of from about 50 wt. % to about 85 wt. %.

9. The electrical connector of claim 1, wherein the polymer composition further comprises at least one hollow inorganic filler having a dielectric constant of about 3.0 or less at a frequency of 100 MHz.

10. The electrical connector of claim 1, wherein the polymer composition further comprises at least one dielectric filler comprising a second fibrous filler, a particulate filler, or a mixture thereof.

11. The electrical connector of claim 1, wherein the polymer composition further comprises at least one hollow inorganic filler having a dielectric constant of about 3.0 or less at a frequency of 100 MHz and at least one dielectric filler wherein the weight ratio of the at least one hollow inorganic filler to the at least one dielectric filler is from about 0.1 to about 10.

12. The electrical connector of claim 11, wherein the weight ratio of the at least polymer to the at least one hollow inorganic filler is from about 0.1 to about 10.

13. The electrical connector of claim 11, wherein the at least one hollow inorganic filler comprises hollow glass spheres.

14. The electrical connector of claim 13, wherein the hollow glass spheres have an aspect ratio of from about 0.8 to about 1.2.

15. The electrical connector of claim 13, wherein the hollow glass spheres have an average diameter of from about 1 micrometer to about 150 micrometers.

16. The electrical connector of claim 13, wherein the thickness of the walls of the hollow glass spheres is about 40% or less the average diameter of the hollow glass spheres.

17. The electrical connector of claim 11, wherein the at least one hollow inorganic filler is present in an amount of from about 5 wt. % to about 40 wt. %.

18. The electrical connector of claim 10, wherein the second fibrous filler comprises wollastonite.

19. The electrical connector of claim 10, wherein the particulate filler comprises mica.

20. The electrical connector of claim 10, wherein the at least one dielectric filler is present in an amount of from about 3 wt. % to about 40 wt. %.

21. The electrical connector of claim 1, wherein the polymer composition has a melt viscosity of from about 10 to about 100 Pa-s, as determined at a shear rate of 1,000 seconds$^{-1}$ and a temperature of 20° C. higher than the melting temperature of the at least one polymer.

22. The electrical connector of claim 1, wherein the polymer composition further comprises a laser activatable additive.

23. A 5G radio frequency communication system comprising:
    a radio frequency component configured for operation at greater than about 3 GHz, the radio frequency component comprising a contact pin; and
    an electrical connector coupled with the radio frequency component, the electrical connector comprising at least two opposing walls between which a passageway is defined, wherein the contact pin of the radio frequency component is received within the passageway of the electrical connector, wherein the walls have a width of about 500 micrometers or less, the walls being formed from a polymer composition that comprises a polymer matrix containing at least one liquid crystalline polymer having a glass transition temperature of about 30° C. or more in an amount of from about 30 wt. % to about 90 wt. %, and further wherein the polymer composition exhibits a dielectric constant of about 4 or less and a dissipation factor of about 0.02 or less, as determined at a frequency of 10 GHz, wherein the liquid crystalline polymer has a total amount of repeating units derived from naphthenic hydroxycarboxylic and/or naphthenic dicarboxylic acids of about 10 mol. % or more, repeating units derived from 4-hydroxybenzoic acid in an amount from about 1 mol. % to about 20 mol. %, and repeating units derived from aromatic dicarboxylic acids in an amount from 25 mol. % to about 30 mol. %, and wherein the polymer composition comprises a fibrous filler containing glass and having a dielectric constant of about 5.5 or less at a frequency of 1 GHz.

24. The 5G radio frequency communication system of claim 23, wherein the radio frequency component is configured for operation at greater than 28 GHz.

25. The 5G radio frequency communication system of claim 23, wherein the radio frequency component comprises at least one of a front end module or an antenna.

26. The 5G radio frequency communication system of claim 23, wherein the radio frequency component is included in at least one of a base station, a user computing device, a relay station, a repeater, or a 5G smartphone.

27. The electrical connector of claim 1, wherein the liquid crystalline polymer comprises repeating units derived from 6-hydroxy-2-naphthoic acid in an amount of 50 mol. % or more.

28. The electrical connector of claim 1, wherein the polymer composition exhibits a dielectric constant of about 3.5 or less, as determined at a frequency of 10 GHz.

29. The 5G radio frequency communication system of claim 23, wherein the liquid crystalline polymer comprises repeating units derived from aromatic diols in an amount from about 1 mol. % to about 30 mol. %.

30. The 5G radio frequency communication system of claim 23, wherein the polymer composition exhibits a dielectric constant of about 3.5 or less, as determined at a frequency of 10 GHz.

* * * * *